(12) United States Patent
Townsend et al.

(10) Patent No.: US 12,507,595 B2
(45) Date of Patent: Dec. 23, 2025

(54) QUADRATURE BIAS ERROR REDUCTION FOR VIBRATING STRUCTURE GYROSCOPES

(71) Applicant: Atlantic Inertial Systems Limited, Plymouth (GB)

(72) Inventors: Kevin Townsend, Liskeard (GB); Christopher Paul Fell, Dublin (IE)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 959 days.

(21) Appl. No.: 17/499,927

(22) Filed: Oct. 13, 2021

(65) Prior Publication Data

US 2022/0123198 A1    Apr. 21, 2022

(30) Foreign Application Priority Data

Oct. 16, 2020 (EP) .................................... 20275161

(51) Int. Cl.
*H10N 30/30* (2023.01)
*B81B 3/00* (2006.01)
*H10N 30/87* (2023.01)

(52) U.S. Cl.
CPC ......... *H10N 30/302* (2023.02); *B81B 3/0021* (2013.01); *H10N 30/87* (2023.02); *B81B 2201/0221* (2013.01); *B81B 2201/0242* (2013.01)

(58) Field of Classification Search
CPC .. H10N 30/302; H10N 30/087; B81B 3/0021; B81B 2001/0221; B81B 2001/0242
See application file for complete search history.

(56) References Cited

U.S. PATENT DOCUMENTS

| | | |
|---|---|---|
| 5,739,410 A | 4/1998 | Fell |
| 5,992,233 A | 11/1999 | Clark |
| 7,051,590 B1 * | 5/2006 | Lemkin .............. G01C 19/5719 73/504.04 |

(Continued)

OTHER PUBLICATIONS

Extended European Search Report for International Application No. 20275161.6 dated Apr. 7, 2021, 11 pages.

(Continued)

*Primary Examiner* — J. San Martin
(74) *Attorney, Agent, or Firm* — CANTOR COLBURN LLP

(57) ABSTRACT

A vibrating structure angular rate sensor includes a mount, a planar vibrating structure and a plurality of compliant supports extending between the mount and the planar vibrating structure to support the vibrating structure thereby allowing the planar vibrating structure to oscillate in its plane relative to the mount in response to an electrical excitation. A first set of transducers is arranged on the planar vibrating structure to apply, in use, an electrical excitation to the planar vibrating structure and to sense, in use, motion resulting from oscillation of the planar vibrating structure in its plane. A plurality of capacitive regions is fixed at a distance from the planar vibrating structure in its plane. The capacitive regions form a second set of transducers configured to apply, in use, an electrostatic force to the planar vibrating structure which induces a change in the frequency of oscillation of the planar vibrating structure.

13 Claims, 14 Drawing Sheets

(56) References Cited

U.S. PATENT DOCUMENTS

| | | |
|---|---|---|
| 7,637,156 B2 | 12/2009 | Araki et al. |
| 7,958,781 B2 | 6/2011 | Fell |
| 8,347,718 B2 | 1/2013 | Malvern et al. |
| 8,381,590 B2 | 2/2013 | Ikeda et al. |
| 8,555,717 B2 | 10/2013 | Fell et al. |
| 9,677,885 B2 | 6/2017 | Fell |
| 9,709,401 B2 | 7/2017 | Fell |
| 10,422,642 B2 | 9/2019 | Fell |
| 2006/0213266 A1 | 9/2006 | French et al. |
| 2007/0220972 A1* | 9/2007 | Araki ............... G01C 19/5684 73/504.12 |
| 2009/0301194 A1 | 12/2009 | Challoner |
| 2010/0212424 A1 | 8/2010 | Malvern et al. |
| 2010/0218606 A1 | 9/2010 | Fell |
| 2010/0281976 A1 | 11/2010 | Ikeda et al. |
| 2011/0030474 A1 | 2/2011 | Kuang et al. |
| 2011/0167911 A1 | 7/2011 | Fell et al. |
| 2011/0265564 A1 | 11/2011 | Acar et al. |
| 2012/0096943 A1 | 4/2012 | Potasek et al. |
| 2012/0125100 A1 | 5/2012 | Araki et al. |
| 2013/0298671 A1 | 11/2013 | Acar et al. |
| 2014/0331769 A1 | 11/2014 | Fell |
| 2015/0040663 A1 | 2/2015 | Fell et al. |
| 2015/0101409 A1 | 4/2015 | Fell |
| 2016/0153781 A1 | 6/2016 | Blomqvist et al. |
| 2016/0245653 A1* | 8/2016 | Park ............... G01C 19/5684 |
| 2017/0115117 A1 | 4/2017 | Fell |
| 2018/0038692 A1 | 2/2018 | Prati et al. |
| 2018/0231382 A1 | 8/2018 | Malvern |
| 2019/0145771 A1* | 5/2019 | Townsend ......... G01C 19/5684 73/504.13 |

OTHER PUBLICATIONS

Decision to Grant on the Japanese application JP2021145090, mailed Jul. 1, 2025, 3 pages.

English Translation of Decision to Grant on the Japanese application JP2021145090, mailed Jul. 1, 2025, 1 page.

English Translation of Japanese Office Action for Application JP2021145090, mailed Dec. 3, 2024, 5 pages.

Japanese Office Action for Application JP2021145090, mailed Dec. 3, 2024, 5 pages.

\* cited by examiner

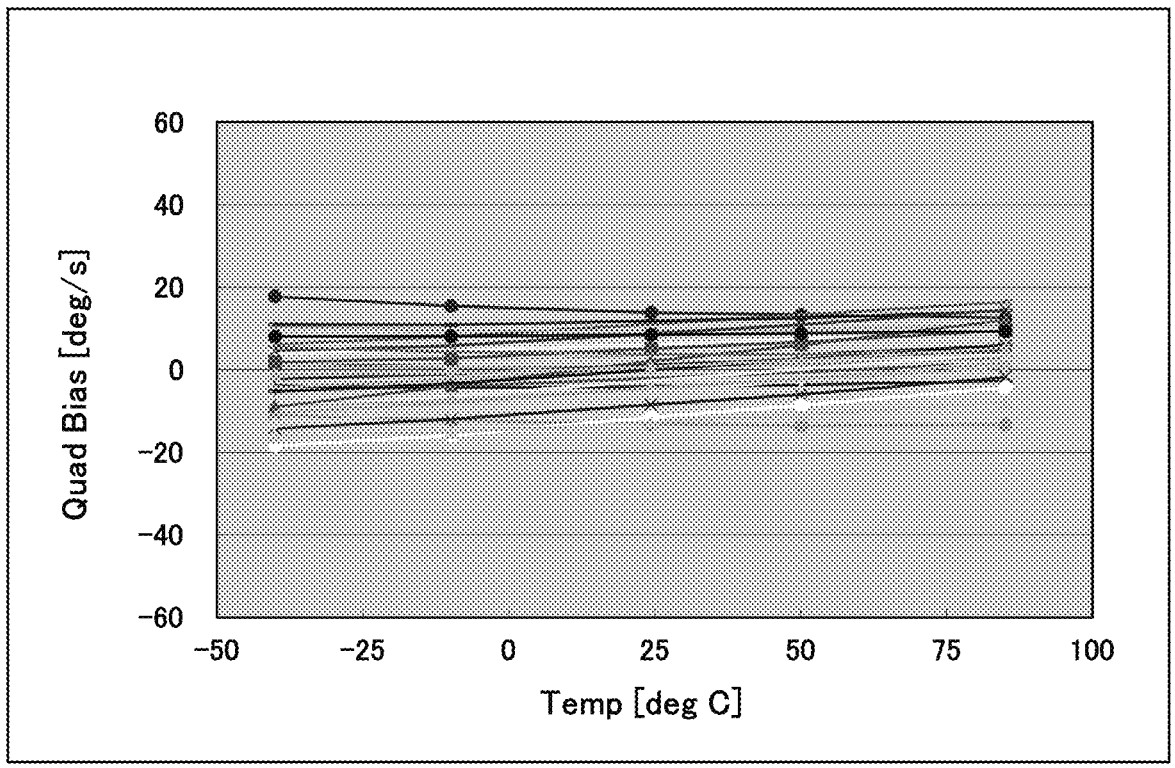
FIG. 1a – PRIOR ART
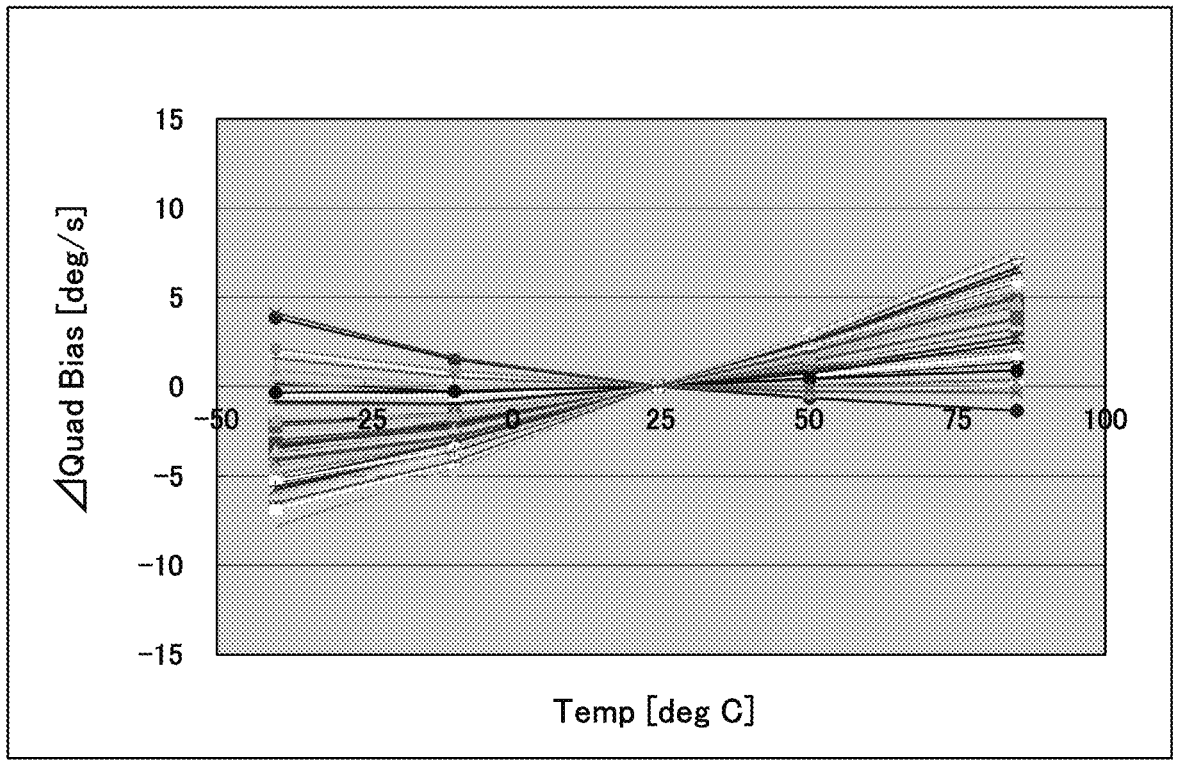
FIG. 1b – PRIOR ART

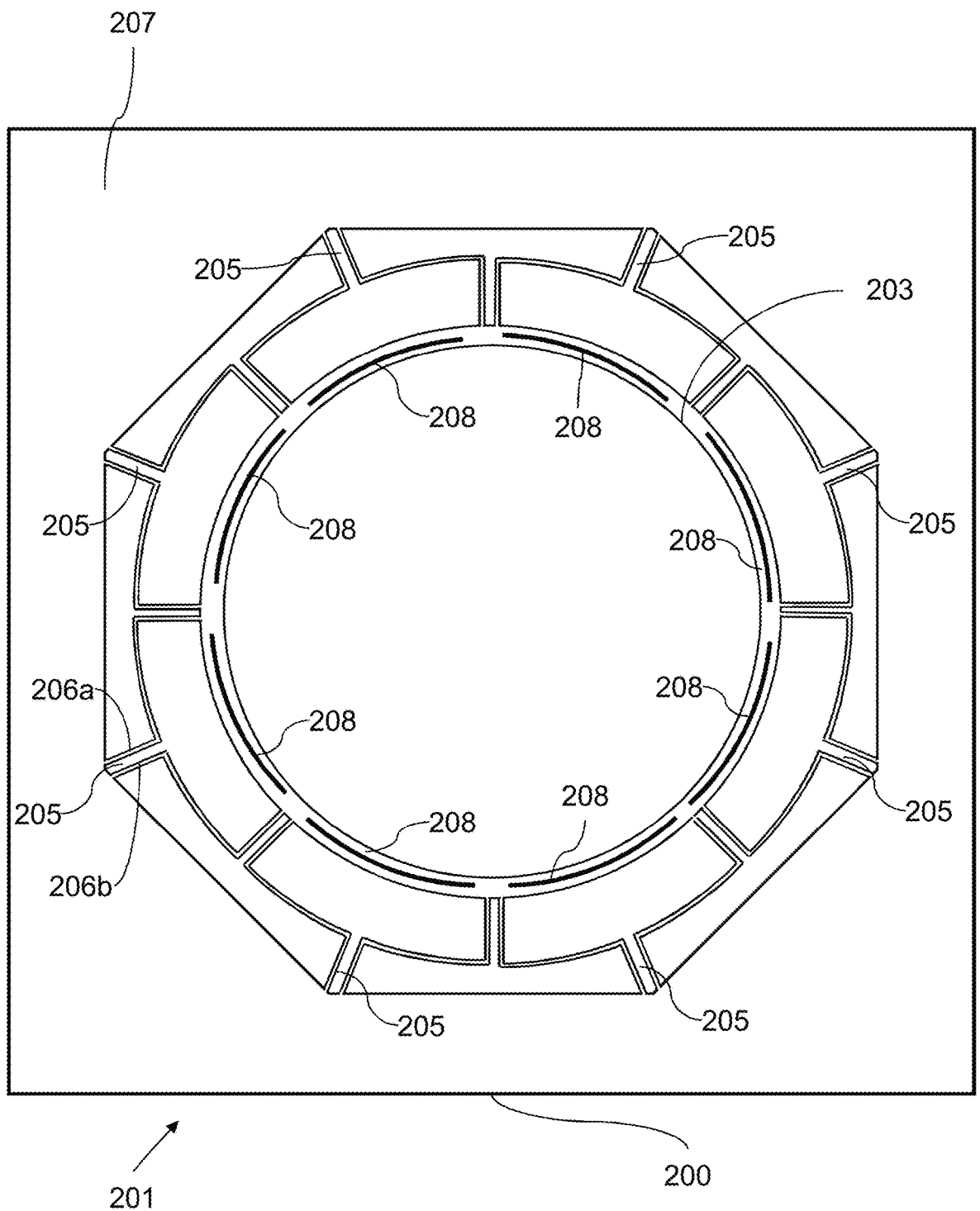
FIG. 2 – PRIOR ART

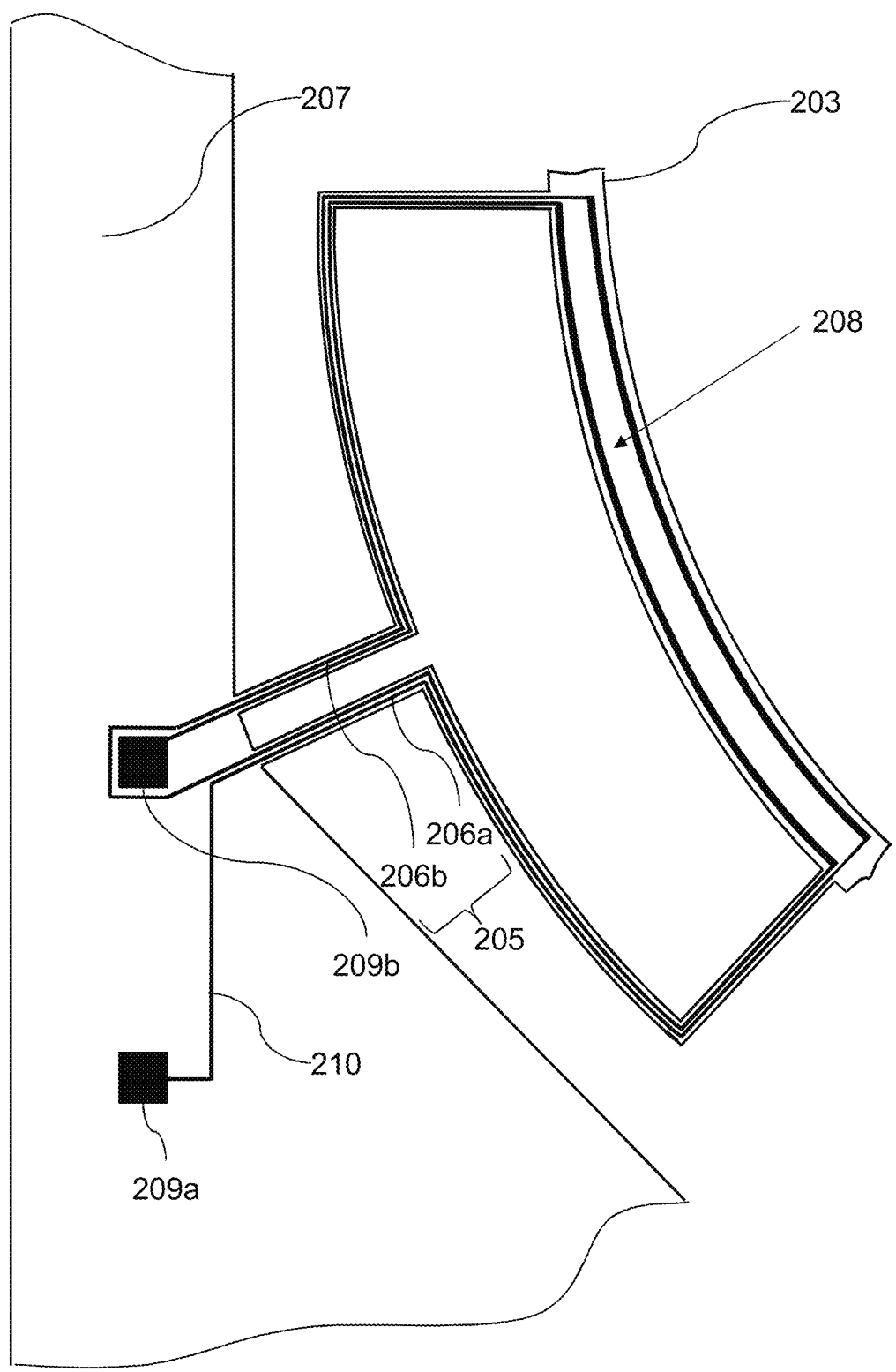
FIG. 3 – PRIOR ART

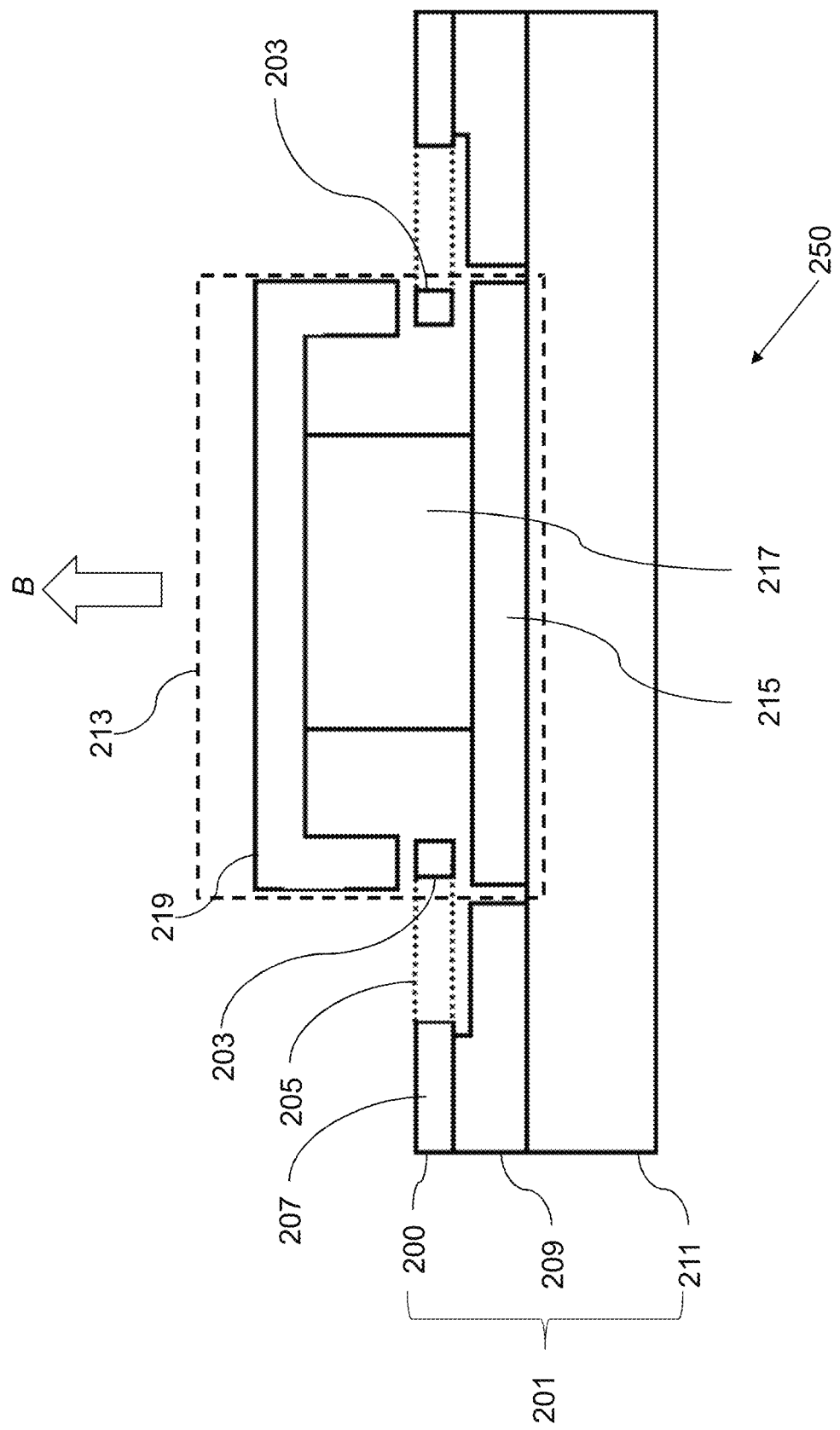
FIG. 4 – PRIOR ART

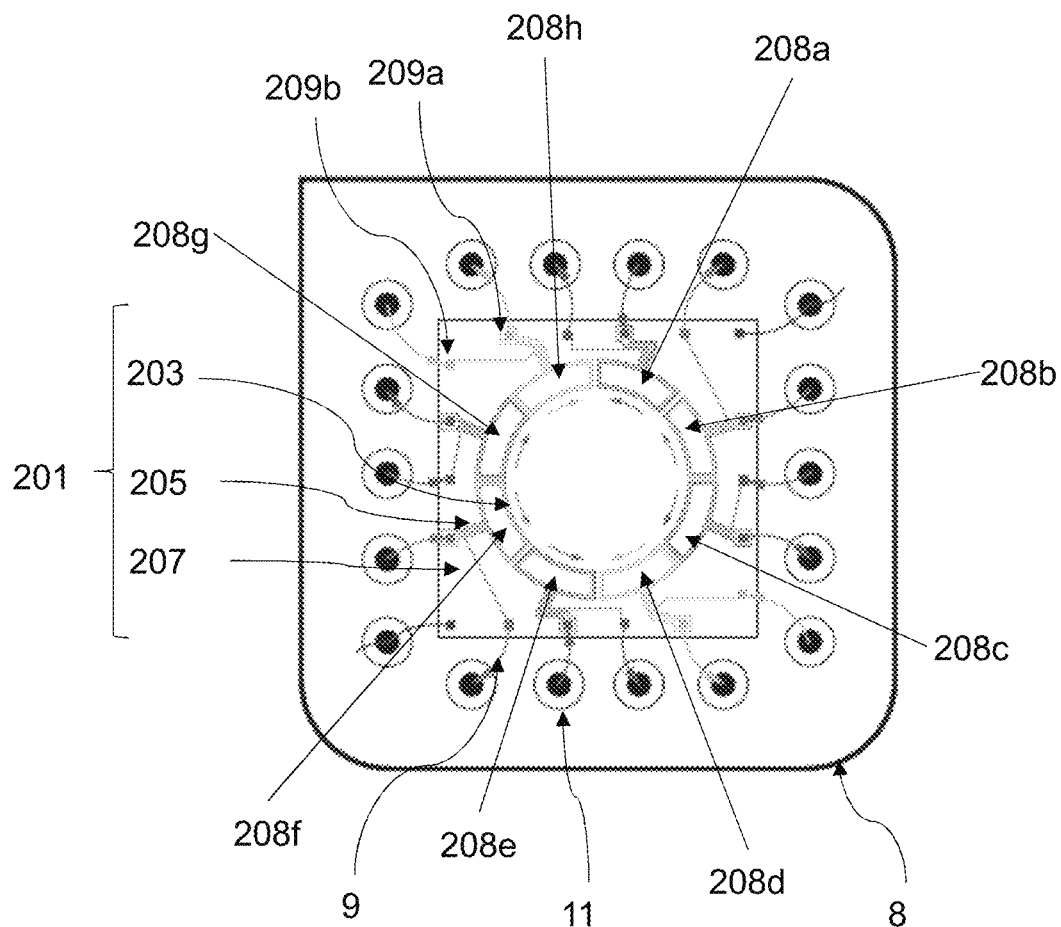
FIG. 5 – PRIOR ART

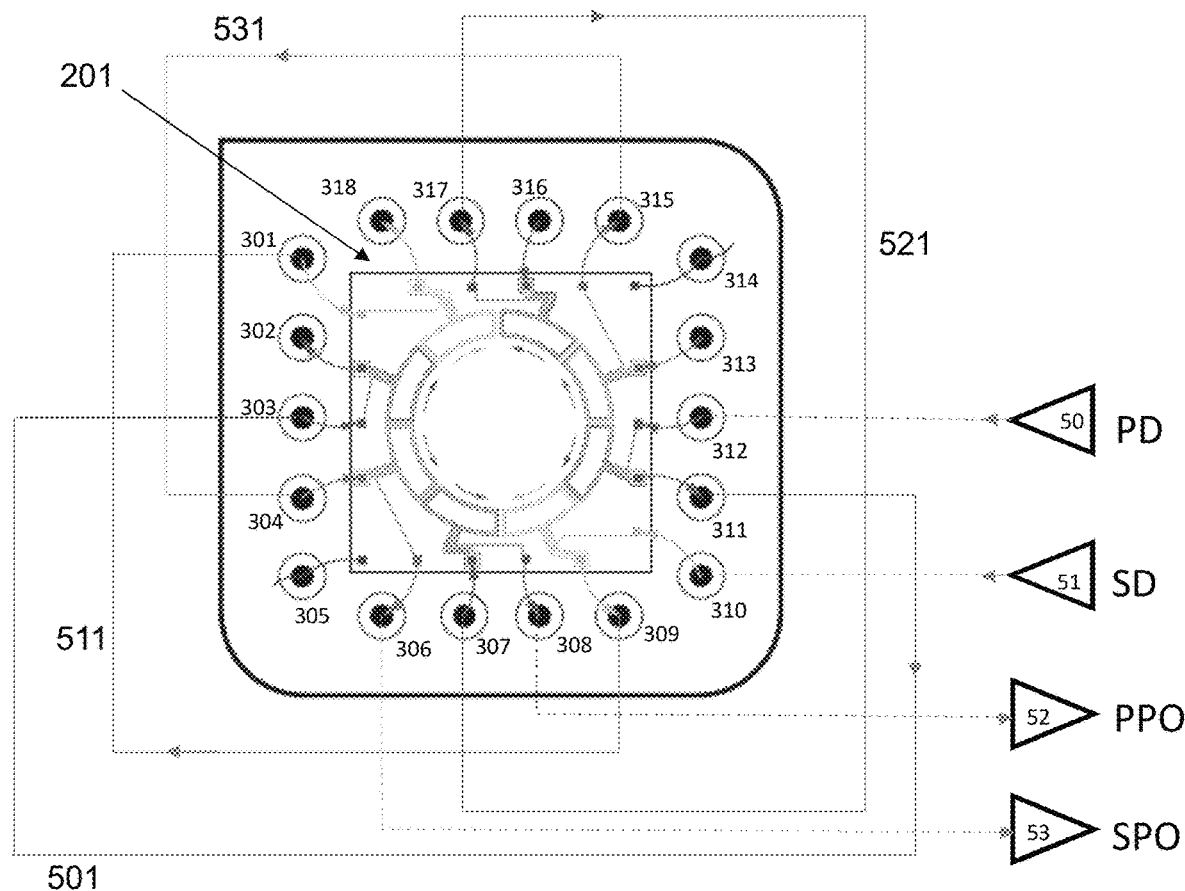
FIG. 6 – PRIOR ART

QUADRATURE BIAS ERROR REDUCTION FOR VIBRATING STRUCTURE GYROSCOPES

CROSS-REFERENCE TO RELATED APPLICATIONS

This application claims priority to European Patent Application No. 20275161.6 filed Oct. 16, 2020, the entire contents of which is incorporated herein by reference.

TECHNICAL FIELD

This disclosure generally relates to vibrating structure gyroscopes and angular rate sensors and, more specifically, to Coriolis-type angular rate sensors comprising a vibrating structure such as a planar ring, and to methods of forming a vibrating structure gyroscope so as to reduce quadrature bias error without introducing charge migration effects.

BACKGROUND

As the performance of microelectromechanical systems (MEMS) gyroscopes improves, they are increasingly being used in more demanding applications to replace more expensive and larger devices such as fibre optic or spinning mass gyroscopes. The wider uptake of MEMS gyroscopes is however still restricted due to their limited performance, particularly in terms of the time and temperature stability of the bias. Gyroscope bias is the output signal even in the absence of any rotation, which then appears as an error in the angular rate measurement when the device is rotating.

Coriolis-type MEMS gyroscopes which utilise vibrating structures in the form of planar silicon ring resonators are among the best performing devices in terms of bias and overall stability. These devices typically utilise a pair of cos 2θ resonance modes which are tuned to be precisely frequency matched in order to achieve optimum performance. The accuracy of the mode frequency matching is critical in reducing the quadrature bias error, which is typically one of the dominant errors limiting overall performance.

Quadrature bias errors arise due to imperfections in the metrology of the resonator structure. These imperfections cause oscillation of the response mode which is in phase quadrature (i.e. has a 90° phase relationship) to the motion induced by applied rotation rates, and may be present even when the device is not rotating. The magnitude of the quadrature motion may also be large in comparison to the in-phase motion, which is measured to provide the rotation rate information.

In order to recover the required rotation rate induced signal in the presence of a large quadrature signal, stringent requirements are placed on the phase accuracy of the detection system. Accurately phased electronics can allow for the quadrature signal to be substantially rejected. However, practical limitations on the accuracy with which this phasing can be set means that some of the quadrature signal will typically remain, and will contaminate the true rotation induced in-phase signal.

MEMS gyroscopes which utilise planar silicon ring resonator structures, such as described in U.S. Pat. No. 8,555,717, are capable of delivering the highest performance within this class of Coriolis-type gyroscopes. In common with other MEMS gyroscopes, quadrature bias is a key error source which contributes to the overall bias and error in measurement of the angular rate, as described in U.S. Pat. No. 8,555,717.

Bias error is driven by a combination of the frequency mismatch, $\Delta F$, between the primary and secondary cos 2θ resonance modes, and the angular alignment, $\alpha$, of these modes with respect to the drive transducers. The magnitude of the quadrature bias, $\Omega_Q$, for such a device is given by:

$$\Omega_Q = K \times \Delta F \times \sin 4\alpha$$

where K is a constant including terms for the modal coupling coefficient & the secondary drive & primary pick-off gains. As described in U.S. Pat. No. 8,555,717, the extent to which this error source degrades the rate bias performance depends on both the magnitude of the quadrature bias, $\Omega_Q$, and the phase accuracy of the control electronics. Where a small phase error, $\phi_E$, exists the quadrature bias error, $\Omega_{Err}$, is given by:

$$\Omega_{Err} = K \times \Delta F \times \sin 4\alpha \times \sin \phi_E$$

Due to manufacturing tolerances in the MEMS processing, these mode frequencies will typically be split by up to ±10 Hz immediately after fabrication. This initial frequency offset may be adjusted using a laser trimming process e.g. as described in U.S. Pat. Nos. 5,739,410 and 9,677,885. This process uses a laser to remove mass along the neutral axis of the ring to set the frequency split to approximately zero in an ambient temperature and pressure environment.

Although these mode frequencies are, in principle, exactly matched, in practice, the balancing accuracy of the final assembled device is limited by a number of additional factors. These include the accuracy of both the frequency measurement and the laser balancing process itself, as well as any subsequent packaging induced stress and strain effects which will differentially perturb the mode frequencies and alignment. Packaging stress and strain arises due to the use of dissimilar materials in the MEMS device itself and the package into which it is bonded, which results in differential expansion effects. These effects are known to vary over the operating temperature range of the device, and induce corresponding shifts in the quadrature bias.

Design modifications have been implemented to the design and manufacturing processes of the device of U.S. Pat. No. 8,555,717 to reduce the magnitude of the quadrature bias error in order to achieve improved performance. U.S. Pat. No. 9,677,885 describes a method which improves the resolution and accuracy of the laser balancing process. This enables the initial frequency split, $\Delta F$, to be significantly reduced thus reducing the offset value of $\Omega_Q$. U.S. Ser. No. 10/422,642 and U.S. Pat. No. 9,709,401 describe design features which limit the impact of these differential expansion driven effects to reduce the variation in $\Omega_Q$ over the operating temperature range of the device. U.S. Ser. No. 10/422,642 describes a mounting arrangement for the attachment of the magnetic circuit components onto the glass layer of the MEMS structure which reduces the stress and strain coupling into the resonator structure due to differential expansion. U.S. Pat. No. 9,709,401 describes the use of an octagonal shaped glass spacer layer onto which the silicon structure is bonded. The octagonal structure has the beneficial effect that, unlike the standard square MEMS die structure, stress and strain coupling into the silicon ring resonator structure, via the support legs, is effectively symmetric for the cos 2θ mode pair. This ensures that any resultant frequency perturbations are substantially equal for the two modes and therefore minimises the shift in quadrature bias.

Very low values of $\Omega_Q$ can be achieved using planar silicon ring gyroscopes which utilise capacitive transducers (as described, for example, in U.S. Pat. Nos. 7,637,156 and 7,958,781). Such devices incorporate discrete capacitor plates fixed around the inner and outer periphery of the ring, with which the ring forms a common capacitor plate. DC offset voltages are applied to the discrete capacitor plates to locally reduce stiffness, as described in U.S. Pat. Nos. 7,637,156 and 7,958,781. These voltages may be varied to accurately minimise ΔF and therefore to set $\Omega_Q \sim 0°/s$. By adjusting these voltages in real time, this null value of quadrature bias can be maintained, even in the presence of temperature-induced variation in the stress and strain which would otherwise result in changes in $\Omega_Q$.

However, capacitive MEMS gyroscopes typically function by applying a fixed offset voltage between two transducer plates, and hence are particularly susceptible to charge migration effects (commonly referred to as charge trapping or dielectric charging). The presence of a fixed voltage gradient results in an accumulation of charge on dielectric layers on the surface of the capacitor plates, which may consist of a thin native oxide layer. This effectively induces a shift in the effective voltage offset across the two plates over time which alters the transducer gain. Where this effect occurs uniformly for all transducers, the scale factor of the device will be shifted with any non-uniform variation inducing bias shifts. While a method does exist to address this scale factor variation (for example as described in U.S. Pat. No. 8,347,718), this is not effective in eliminating the bias shift. As such, charge migration effects represent a major performance limitation for capacitive MEMS gyroscopes. These effects are not present for devices such as described in U.S. Pat. No. 8,555,717, which use inductive transducers.

U.S. Pat. No. 8,555,717 describes a MEMS gyroscope including a vibrating ring structure and using inductive drive and pick-off transducers, with the oscillation modes having been tuned mechanically using a laser trimming process during manufacture of the ring structure. The use of inductive transducers is highly beneficial for a number of reasons, including their inherently linear behaviour and their immunity to charge migration effects which are known to adversely affect capacitive transducers. However the limited accuracy achievable using this mechanical mode balancing technique restricts the overall performance of inductive transducer gyroscopes.

Higher accuracies may be achieved using MEMS vibrating structure devices employing electrostatic transducers, such as described in U.S. Pat. No. 7,958,781. Such devices have the advantage that frequency matching can be performed electrically to a high degree of accuracy, and quadrature bias errors can be substantially eliminated. Gyroscopes employing electrostatic transducers are however susceptible to charge migration effects, which adversely affect the bias and scale factor stability of such devices.

It is therefore desirable to provide a vibrating structure gyroscope which is not susceptible to charge migration effects, and where the mode frequencies can be matched to a high degree of accuracy, in order to achieve improved bias performance.

SUMMARY

According to a first aspect of this disclosure, there is provided a vibrating structure angular rate sensor comprising of a mount, a planar vibrating structure, and a plurality of compliant supports extending between the mount and the planar vibrating structure to support the vibrating structure, thereby allowing the planar vibrating structure to oscillate in its plane relative to the mount in response to an electrical excitation; a first set of transducers arranged on the planar vibrating structure to apply, in use, an electrical excitation to the planar vibrating structure and to sense, in use, motion resulting from oscillation of the planar vibrating structure in its plane; and a plurality of capacitive regions fixed at a distance from the planar vibrating structure in its plane, wherein the capacitive regions form a second set of transducers configured to apply, in use, an electrostatic force to the planar vibrating structure, which induces a change in the frequency of oscillation of the planar vibrating structure.

It will be appreciated that such a vibrating structure angular rate sensor includes a combination of two different types of transducers. The first set of transducers is arranged directly on the planar vibrating structure to apply an electrical excitation and directly sense motion resulting from oscillation of the planar vibrating structure. The first set of transducers therefore has a linear relationship with oscillations of the planar vibrating structure. The first set of transducers can be used to measure angular rate. As will be described further below, examples of transducers that can be arranged directly on the planar vibrating structure are inductive-type and piezoelectric-type transducers. Voltages applied and sensed using such linear transducers do not result in charge migration effects, but quadrature bias can arise during use e.g. due to fluctuations in the environmental temperature.

The second set of transducers comprises a plurality of capacitive regions that are fixed at a distance from the planar vibrating structure (rather than being arranged directly on the planar vibrating structure). This second set of transducers can be used to apply an electrostatic force to the planar vibrating structure, in addition to the first set of transducers being used for the normal functions of driving oscillations and sensing deformations for the purposes of measuring angular rate. The electrostatic force can be applied during use to balance the oscillation mode frequencies and minimise quadrature bias. This is an inherently non-linear interaction with the planar vibrating structure, but the second set of transducers is not intended to be used for the purposes of measuring angular rate.

Such a vibrating structure angular rate sensor may be operated in any suitable way to take advantage of the two types of transducers, wherein the first set of transducers provides a linear interaction with the planar vibrating structure and the second set of transducers provides a non-linear interaction.

In accordance with one or more examples of this disclosure, a first subset of the first set of transducers is configured to cause the planar vibrating structure to oscillate relative to the mount in a primary mode; a second subset of the first set of transducers is configured to sense motion resulting from oscillation of the planar vibrating structure relative to the mount in a secondary mode induced by Coriolis force when an angular rate is applied around an axis substantially perpendicular to the plane of the planar vibrating structure; a third subset of the first set of transducers is configured to sense motion resulting from oscillation of the planar vibrating structure in the primary mode. By detecting the oscillation of the planar vibrating structure in the primary mode using the third subset of the first set of transducers, the amplitude of the oscillations in the primary mode may be measured and compared to a reference level, in order to adjust the magnitude of the oscillations in the primary mode caused by the first subset of the first set of transducers, to maintain a constant amplitude of oscillation. Furthermore, in such examples it is preferable that the second set of transducers is configured to apply an electrostatic force to the planar vibrating structure which induces a change in the frequency of oscillation in the primary mode and/or secondary mode so as to match the frequencies. The electrostatic force applied by the second set of transducers can be used to adjust the response of the planar vibrating structure so as to make the frequency of oscillation in the secondary mode match the frequency of oscillation in the primary mode (or vice versa). This can minimise the quadrature bias error appearing in the measurement of angular rate by the first set of transducers.

In accordance with one or more examples of this disclosure, a fourth subset of the first set of transducers is configured to apply an electrical excitation to null the oscillation of the planar vibrating structure in the secondary mode. The fourth subset of the first set of transducers may be used to null the oscillation of the planar vibrating structure in the secondary mode induced by Coriolis force. This may correspond to closed loop operation of a Coriolis-type gyroscope.

Various geometries have been proposed for Coriolis-type gyroscopes. The planar vibrating structure may comprise a tuning fork structure. The planar vibrating structure typically has a symmetrical structure, such as a disc or ring. In accordance with one or more examples of this disclosure, the planar vibrating structure is a ring resonator. The mount may be any suitable structure to which the plurality of compliant supports may be attached, and may have various geometries. The mount may consist of a rigid frame, or a central hub. In accordance with one or more examples of this disclosure, the mount is a rigid frame, formed externally to the planar vibrating structure.

The plurality of capacitive regions may have a symmetrical or non-symmetrical arrangement relative to the planar vibrating structure. In some examples, a single set of capacitive regions may be arranged on one side of the planar vibrating structure with no capacitive regions arranged on the other side. In some examples, the capacitive regions may be arranged all around the planar vibrating structure but with unequal spacings such that their arrangement is not symmetrical. There may be an odd number or even number of capacitive regions. However, in accordance with one or more examples of this disclosure, the plurality of capacitive regions is arranged symmetrically around the planar vibrating structure in a circumferential arrangement. This means that the electrostatic force can be applied evenly at different points around the planar vibrating structure to maximise the mode balancing effect. The symmetrical arrangement of capacitive regions may comprise a circumferential arrangement, regardless of the whether the planar vibrating structure also has a circular geometry. In examples wherein the planar vibrating structure is a ring resonator, the circumferential arrangement may comprise a number of capacitor plates equally spaced around the ring resonator. Regardless of the capacitor plates being equally or unequally spaced, it has been appreciated that the capacitive regions may be arranged in groups to assist with the electrostatic balancing regime. In at least some examples, there is a group of four capacitive regions with each of the capacitive regions in the group arranged at 90° intervals in a circumferential arrangement. The circumferential arrangement may include more than one of these groups, for example four groups of four capacitive regions, resulting in 16 equally spaced capacitive regions.

In those examples where the planar vibrating structure is a ring resonator having a circular geometry, it is helpful for the capacitive regions to be fixed in a circumferential arrangement so as to keep a constant distance between the capacitive regions and the ring resonator. The plurality of capacitive regions may be fixed in a circumferential arrangement that is radially outside or inside the ring resonator. As above, the capacitive regions may be arranged in groups to assist with the electrostatic balancing regime. Regardless of how the capacitive regions are grouped for the purposes of applying an electrostatic force, the plurality of capacitive regions may have a physical arrangement resulting from the way the regions are formed during manufacture of the sensor. In accordance with one or more examples of this disclosure, the plurality of capacitive regions comprises a plurality of pairs of capacitive plates fixed in a circumferential arrangement relative to the ring resonator, the pairs being separated by one of the compliant supports. As mentioned above, the circumferential arrangement of capacitive plates may be radially inside or outside the ring resonator.

As discussed above, the first set of transducers is arranged directly on the planar vibrating structure to apply an electrical excitation and to sense a resulting motion. In accordance with one or more examples of this disclosure, the first set of transducers comprises or consists of inductive-type transducers. This means that the planar vibrating structure is electrically excited to oscillate in the presence of a magnetic field and the transducers sense the changes in voltage induced by motion of the planar vibrating structure.

In accordance with one or more examples of this disclosure, the sensor further comprises a magnetic circuit, configured to produce a magnetic field perpendicular to the plane of the planar vibrating structure. In such examples, the first set of transducers may comprise conductive tracking formed on a surface of the planar vibrating structure.

In accordance with one or more examples of this disclosure, in addition or alternatively, the first set of transducers comprises or consists of piezoelectric-type transducers. This means that the planar vibrating structure is electrically excited to oscillate and the piezoelectric transducers deform together with the planar vibrating structure to produce a varying current or voltage in response.

In accordance with one or more examples of this disclosure, the first set of transducers comprises a first set of piezoelectric electrodes formed on a surface of the planar vibrating structure.

Regardless of the type of transducers in the first set, an electrical excitation is required in use and this means that the sensor may include an electrical connection to the first set of transducers. In some examples, the electrical connection could be direct to the first set of transducers e.g. via wire bonds or electrical leads. In accordance with one or more examples of this disclosure, the compliant supports comprise conductive tracking extending between the substrate and the first set of transducers. This means that an electrical connection can conveniently be made via the conductive tracking along the compliant supports.

For the second set of transducers to be able to apply an electrostatic force, an electrical connection is required in use. As the capacitive regions are fixed at a distance from the planar vibrating structure, it may be difficult for the second set of transducers to have the same type of electrical connection as the first set of transducers. Furthermore, the respective electrical connections should allow for the first and second sets of transducers to operate independently of one another. Thus, in accordance with one or more examples of this disclosure, the sensor comprises a first set of electrical connections to the first set of transducers and a second set of electrical connections to the second set of transducers, the first and second sets of electrical connections being independent of one another. In various examples, the second set of electrical connections is direct to the second set of transducers. In accordance with one or more examples of this disclosure, the sensor includes a direct electrical connection to the second set of transducers, e.g. via wire bonds or electrical leads. What is meant by a direct electrical connection is one that does not rely on any conductive tracking extending on the substrate and/or compliant supports. Thus the direct electrical connection may be independent of any conductive tracking providing an electrical connection to the first set of transducers.

It will be understood that the plurality of capacitive regions being fixed at a distance from the planar vibrating structure means that there is a gap between them such that they are electrically isolated. The planar vibrating structure is physically connected to the mount by the compliant supports and typically there is an electrical connection from the mount to the first set of transducers on the planar vibrating structure via the compliant supports. In such examples, if the capacitive regions were fixed directly to the mount then an electrical isolation layer would be required. Thus, in various examples the plurality of capacitive regions is fixed indirectly to the mount so as to be electrically isolated from the planar vibrating structure. For example, the plurality of capacitive regions may be fixed indirectly to the substrate via an intervening insulating layer (such as a glass pedestal layer).

In accordance with one or more examples of this disclosure, the plurality of capacitive regions is fixed indirectly to the mount so as to be electrically isolated from the compliant supports as well as the planar vibrating structure and the mount. To assist with electrical isolation of the capacitive regions, the plurality of capacitive regions may also be fixed at a distance from the compliant supports, i.e. with a gap between them. This distance may be substantially the same as the distance from the planar vibrating structure. However, the inventors have appreciated that the distance between the plurality of capacitive regions and the compliant supports may undesirably affect the stiffness of the compliant supports. This effect can be reduced by increasing the distance between the plurality of capacitive regions and the compliant supports. Thus, in accordance with one or more examples of this disclosure, one or more of the plurality of capacitive regions is fixed at a distance $d_1$ from the planar vibrating structure (in its plane) and at a distance $d_2$ from the compliant supports (in the same plane), wherein $d_2 > d_1$. Each of the plurality of capacitive regions may be fixed in this way.

In a vibrating structure angular rate sensor as disclosed above, the mount, planar vibrating structure and compliant supports may all be formed in the same material layer. This means that these components can be manufactured, for example, from a single silicon wafer. Although in some examples the material layer is a silicon layer, it will be appreciated that in some examples other suitable material layers may be used provided they have suitable mechanical properties and are conductive to some degree. In some examples the capacitive regions may be formed separately and added to the device. However, for efficiency of manufacture it is preferable that the plurality of capacitive regions is also formed in the same material layer as the mount, planar vibrating structure and compliant supports. As mentioned above, this material layer may be supported by an insulating layer. The insulating layer can therefore physically support the capacitive regions which are spaced apart from the planar vibrating structure.

In accordance with one or more examples of this disclosure, the mount, planar vibrating structure, compliant supports, and the plurality of capacitive regions, are formed in the same silicon material layer. In various examples, the vibrating structure angular rate sensor is a MEMS (e.g. silicon) device.

The inventors have also devised suitable methods for forming a vibrating structure angular rate sensor as disclosed herein. The following methods may be particularly suitable for manufacturing a MEMS (e.g. silicon) device.

According to a second aspect of this disclosure, there is provided a method of forming a vibrating structure angular rate sensor, comprising: modifying a first substrate to define a planar vibrating structure and a plurality of compliant supports, the compliant supports extending between a mount formed from the first substrate and the planar vibrating structure to support the planar vibrating structure, thereby allowing the planar vibrating structure to oscillate relative to the mount in response to an electrical excitation; forming a first set of transducers on the planar vibrating structure for applying an electrical excitation to the vibrating structure and for sensing motion, resulting from oscillation of the planar vibrating structure; and forming a plurality of capacitive regions, fixed at a distance from the planar vibrating structure in its plane, wherein the capacitive regions form a second set of transducers for applying an electrostatic force to the planar vibrating structure to induce a change in the frequency of oscillation of the planar vibrating structure.

Such methods therefore result in a vibrating structure angular rate sensor that includes a combination of two different types of transducers. The first set of transducers is arranged directly on the planar vibrating structure and can be used to measure angular rate. The second set of transducers is formed by a plurality of capacitive regions that are fixed at a distance from the planar vibrating structure and can be used to apply an electrostatic force to the planar vibrating structure to balance the oscillation mode frequencies and minimise quadrature bias.

As mentioned above, the plurality of capacitive regions may be formed independently of the first substrate, for example they may be formed directly on a glass pedestal layer to which the substrate comprising the mount and the planar vibrating structure is then fixed. Alternatively the first substrate comprising the mount and the planar vibrating structure may be fixed to a glass pedestal layer, and the capacitive regions may be subsequently formed using a suitable bottom-up e.g. deposition technique. The capacitive regions may therefore be formed from the same material or different material as the first substrate. However, for manufacturing efficiency it is desirable for the plurality of capacitive regions to also be formed by modifying (e.g. etching, micromachining, etc.) the same first substrate. This may involve additional modification steps, implemented at the same time or a different time. Thus, in accordance with one or more examples of this disclosure, forming the plurality of capacitive regions comprises modifying the first substrate to define the plurality of capacitive regions in the same material layer.

The inventors have recognised that, when forming the capacitive regions in the same material layer, the method should allow for the capacitive regions to be fixed indirectly to the mount so as to be electrically isolated from the planar vibrating structure. The first substrate may be fixed to a second substrate that is arranged to support the capacitive regions and provide electrical insulation therebetween. The second substrate may be an insulating layer such as a glass pedestal layer.

In at least some examples, the first substrate may be fixed to a second substrate before modifying the first substrate to define the plurality of capacitive regions. This means that the capacitive regions can be separated and electrically isolated from the planar vibrating structure and compliant supports while remaining supported by the second substrate. For example, the first substrate may be anodically bonded to the second substrate before modifying the first substrate. However, it may be desirable to modify the first substrate (e.g. using deep reactive ion etching) before bonding the first substrate (such as a silicon wafer) to the second substrate. Thus, in accordance with one or more examples of this disclosure, forming the plurality of capacitive regions comprises: modifying the first substrate to define a plurality of semi-isolated regions; then fixing the first substrate to a second substrate, the second substrate comprising support sections configured to support the plurality of capacitive regions; and then separating each of the semi-isolated regions into a pair of electrically isolated capacitive regions. For example, the first substrate may be modified (e.g. etched) to define eight semi-isolated regions and then the semi-isolated regions may be separated (e.g. laser cut) into pairs to form a total of 16 electrically isolated capacitive regions.

In various examples disclosed herein, the first substrate is made of a conductive material (e.g. a silicon wafer). In various examples, the second substrate is made of an electrically insulating material (e.g. a glass layer).

In various examples disclosed herein, forming the first set of transducers comprises forming conductive tracking on a surface of the planar vibrating structure. The first set of transducers may therefore be formed as inductive-type. In at least some examples, the method further comprises fixing the first or second substrate to a further substrate and mounting a magnetic circuit to the further substrate.

In various examples disclosed herein, alternatively or in addition, forming the first set of transducers comprises forming a set of piezoelectric electrodes on a surface of the planar vibrating structure. The first set of transducers may therefore be formed as piezoelectric-type.

In various examples disclosed herein, alternatively or in addition, forming the second set of transducers comprises forming a set of electrodes on the capacitive regions having an electrical connection independent of the first set of transducers.

BRIEF DESCRIPTION OF THE DRAWINGS

Certain exemplary embodiments of this disclosure will now be described, with reference to the accompanying drawings, in which:

FIGS. 1a and 1b illustrate the variation in quadrature bias over the operating temperature range of a typical vibrating structure angular rate sensor as found in the prior art;

FIG. 2 illustrates a standard layout of a planar ring vibrating structure as used in an inductive-type vibrating structure angular rate sensor according to the prior art;

FIG. 3 shows an exemplary layout of a transducer in an inductive-type vibrating structure angular rate sensor;

FIG. 4 shows a cross-sectional view of an inductive-type vibrating structure angular rate sensor including a planar ring vibrating structure as known from the prior art;

FIG. 5 shows a package layout and connections between a vibrating structure angular rate sensor and a package base according to the prior art;

FIG. 6 illustrates the layout of electronic connections between a vibrating structure angular rate sensor and associated control electronics as known from the prior art;

DETAILED DESCRIPTION

Figure 7:
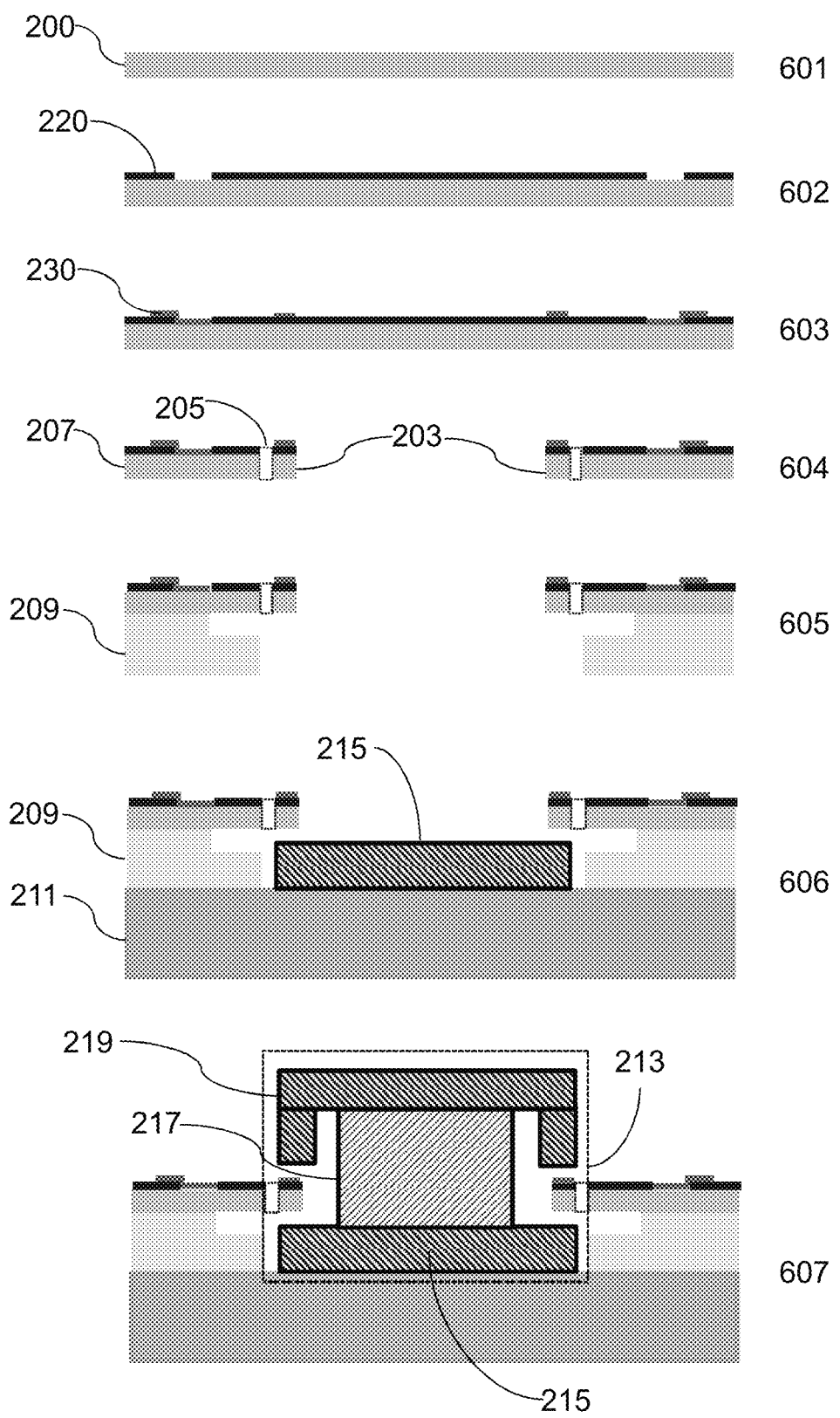
FIG. 7 schematically illustrates the steps of a fabrication process for forming a vibrating structure angular rate sensor according to the prior art.

FIG. 1a shows exemplary data for the variation in quadrature bias, $\Omega_Q$, over the operating temperature range of −40° C. to +85° C. for typical prior art inductive MEMS gyroscopes, such as the CRH02 and CRS39 devices, manufactured by Silicon Sensing Systems Ltd., which utilise a planar silicon ring-based MEMS sensor, the SGH03. The bias performance of these devices is primarily determined by the characteristics of the MEMS sensor and the SGH03 is subjected to laser balancing as described above with the aim of minimising the quadrature bias error, $\Omega_Q$.

FIG. 1b shows the $\Omega_Q$ variation where the initial offset at 25° C. has been removed. The initial 25° C. offset is typically less than ±20°/s, and is limited by the accuracy of the laser balancing process described in U.S. Pat. No. 9,677,885. The variation in $\Omega_Q$ with temperature is less than ±10°/s which is primarily driven by the change in the residual stress and strain. This error may change over time due to ageing effects and may also exhibit some level of thermal hysteresis.

When targeting very low bias repeatability, the $\Omega_Q$ levels shown in FIGS. 1a and 1b, which are up to ±72,000 deg/hr, require a phase error accuracy of <0.1 degree to provide a quadrature bias error, $\Omega_{Err}$, of <±100 deg/hr. This represents a major limitation to the bias performance of the device. Achieving significant improvement in the bias performance therefore requires the quadrature bias $\Omega_Q$ to be significantly reduced.

FIG. 2 shows a schematic plan view of the silicon layer 200 of a prior art planar ring MEMS structure 201, such as utilised in the device of U.S. Pat. No. 8,555,717. The silicon layer 200 consists of a planar ring resonator structure 203 which is flexibly attached by means of a multiplicity of compliant supports 205 to a mount 207, for example formed by etching in the silicon layer 200 (as will be described further below). Each of the compliant supports 205 comprises a symmetrical pair of compliant legs 206a, 206b. The compliant legs 206a, 206b are attached at one end to the periphery of the ring resonator structure 203, and at the other end to the mount 207.

Eight transducers 208 are illustrated schematically, formed by conductive tracking loops 210 on the surface of the MEMS structure 201, as shown in FIG. 3. Each of the compliant supports 205 is used to carry a conductive tracking loop 210 to the surface of the ring resonator structure 203, as shown in more detail in FIG. 3. Each tracking loop 210 passes from a first contact pad 209a, located on the mount 207, along the first leg 206a of the compliant support 205, around an eighth segment on the surface of the ring resonator structure 203 and then back to a second contact pad 209b on the mount 207 via the adjacent leg 206b of the pair.

A schematic cross-sectional view of an inductive gyroscope 250 including the fully assembled MEMS structure 201 is shown in FIG. 4. The mount 207 of the silicon layer 200 is bonded to a glass pedestal layer 209 which is in turn bonded to a glass support 211. A magnetic circuit 213, which consists of an annular disc lower pole piece 215, a disc shaped permanent magnet 217, and an annular upper pole piece 219, is also bonded to the glass support 211. The magnetic circuit 213 is arranged such that a magnetic field, B, is provided which is focused around the planar ring resonator structure 203, perpendicular to the plane of the ring.

As shown in FIG. 5, the MEMS structure 201 is typically mounted on the base 8 of a sealed metal can package with electrical connections made from the contact pads 209a, 209b of each transducer 208a-208h in the set of inductive transducers, via wire bonds 9, to isolated pin connections 11 in the package base 8. The package is mounted on a printed circuit board (PCB) via the contact pins 11 in the base 8 which connect to electrical circuitry (not shown in FIG. 5).

The pin connections 11, labelled as 301-318 in FIG. 6, are arranged on a PCB with electrical connections between the pins 301-318 as shown. The primary drive (PD) current is applied via circuitry on the PCB at PD input 50 to pin 312. The PD current flows around a first tracking loop to pin 311. Thus pins 311, 312 correspond to a first primary drive transducer 208c. Pin 311 is connected via tracking 501 on the PCB to pin 303 and the PD current then flows around a second tracking loop to pin 302. Pins 302, 303 correspond to a second primary drive transducer 208g that is diametrically opposed to the first primary drive transducer 208c, forming a symmetrical pair of primary drive transducers. Similarly, a first primary sensing or pick off (PPO) tracking loop connects from pin 316 around an eighth segment of the ring to pin 317 which is electrically connected via tracking 521 on the PCB to pin 307. A second tracking loop runs from pin 307, via a second MEMS ring segment, to pin 308 which is then connected to a PPO output 52 on the PCB. The pins 316, 317 and 307, 308 correspond to a symmetrical pair of diametrically opposed primary pick-off transducers 208a, 208e.

The two secondary drive (SD) loop segments, the first of which is connected to pins 310 and 309 and the second to pins 301 and 318, are similarly connected in series by tracking 511 on the PCB between pins 309 and 310 with the SD current applied via pin 310 from SD input 51. The pins 309, 310 and 301, 318 correspond to a symmetrical pair of diametrically opposed secondary drive transducers 208d, 208h. A secondary sensing or pick off (SPO) loop between pins 313 and 315 is connected by tracking 531 on the PCB to a second loop between pins 304 and 306. Pin 306 connects to SPO output 53 on the PCB. The pins 313, 315 and 304, 306 correspond to a symmetrical pair of diametrically opposed secondary pick-off transducers 208b, 208f. Pins 305 and 314 connect the silicon layer of the MEMS structure 201 and the can package base to the PCB ground.

As described in U.S. Pat. No. 8,555,717, an alternating current signal is applied via the PD input 50 and the SD input 51 to the transducers 208c, 208d, 208g, 208h on specific segments of the ring to apply Lorentz forces to control the vibrational motion of the ring resonator structure 203. When a rotation at an angular rate $\Omega$ is applied around an axis perpendicular to the plane of the ring, Coriolis forces couple energy into a secondary mode of vibration, with the amplitude of the vibration being proportional to the applied angular rate. The resulting motion of the ring resonator structure 203 in the magnetic field induces a voltage in the transducers 208e, 208f, 208a, 208b of the remaining ring segments, which can be used to provide signals indicative of the ring motion, which can be detected by means of the PPO and SPO outputs 52, 53.

A typical fabrication process for forming the planar ring MEMS structure 201 illustrated in FIGS. 2 to 6 is shown in FIG. 7. The fabrication process begins, in step 601, with the silicon substrate 200 having a typical thickness~100 μm. In step 602, a thin insulating oxide layer 220 is formed on the upper surface of the silicon wafer 200, with holes provided in specific locations to allow subsequent grounding of the conductive silicon layer 200 beneath. A thin metal layer 230 is then deposited over the oxide layer and holes (in step 603), and is patterned to form isolated conductive tracks (not shown in FIG. 7) for electrical connections. A photoresist layer is then deposited over the metal tracking and patterned to define the areas to be subsequently etched by means of a Deep Reactive Ion Etch (DRIE) process in step 604. In this step the silicon layer 200 is initially temporarily bonded to a support wafer (not shown in FIG. 7) before narrow (10 μm to 30 μm), high aspect ratio trenches (typically 10:1) are etched through the full wafer thickness to define the ring resonator structure 203, the compliant supports 205 and the mount 207. The silicon layer 200 is subsequently removed from the support wafer at which point the silicon sections between the legs 206a, 206b of compliant supports 205, and the sections inside the ring resonator structure 203 are unsupported and are therefore removed. The photoresist layer is then removed, and the silicon layer 200 is anodically bonded to a glass pedestal layer 209 (in step 605) which has been processed to include cavities under the positions of the ring resonator 203 and compliant supports 205, as well as a through-hole for placement of the components of the magnetic circuit 213. A lower glass support 211, with a disc shaped metal lower pole 215 mounted to its upper surface is then glue bonded (in step 606) to the previously anodically bonded silicon wafer 200 and glass pedestal layer 209 such that the pole piece 215 is centrally aligned in the hole in the glass pedestal layer 209 under the silicon ring structure 203. The remaining components of the magnetic circuit 213, comprising the disc shaped permanent magnet 217 and upper pole piece 219, are subsequently glue bonded to complete the device assembly in step 607 to complete the inductive gyroscope 250 as seen assembled in FIG. 4.

Figure 8:
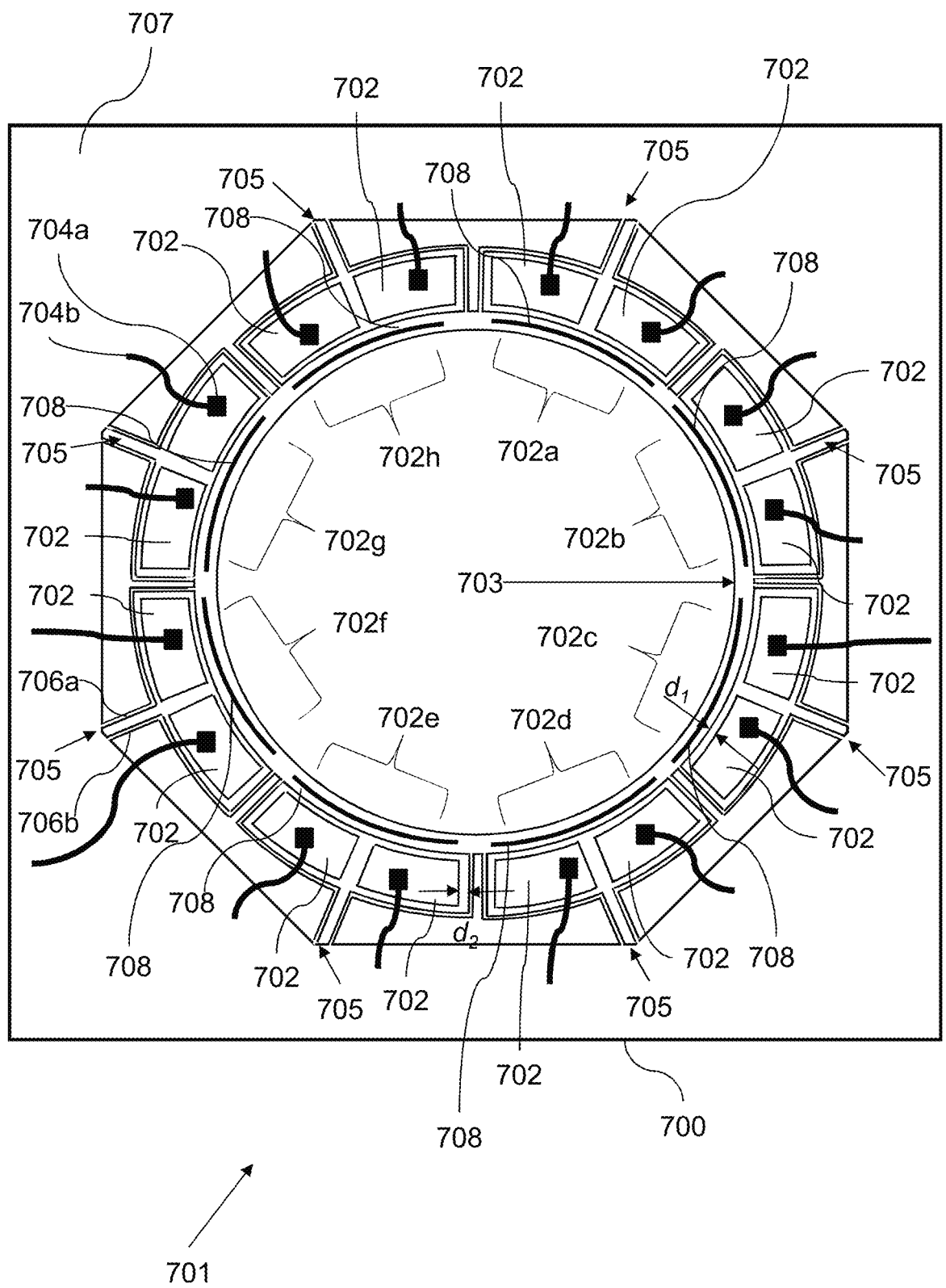
FIG. 8 illustrates the layout of a vibrating planar ring structure as used in a inductive-type vibrating structure angular rate sensor including electrostatic balancing plates according to the present disclosure.

The Applicant has recognised that the MEMS structure 201 shown in FIGS. 2 to 4 may advantageously be modified to enable the mode frequencies to be electrostatically balanced through the addition of a plurality of discrete capacitor plates, e.g. positioned around the outer periphery of the ring. FIG. 8 shows a schematic plan view of an exemplary MEMS structure 701 modified according to the present disclosure, including a plurality of discrete capacitive regions 702, referred to herein as "capacitor plates" 702, to enable electrostatic balancing of a MEMS vibrating structure 703 in an inductive gyroscope of the type described above.

In FIG. 8, a silicon layer 700 comprises a ring resonator structure 703 flexibly attached, by means of a multiplicity of compliant supports 705, to a mount 707. As compared to FIG. 2, it can be seen that there are additionally sixteen equiangularly spaced capacitor plates 702 arranged symmetrically around the ring resonator structure 703 in a circumferential arrangement. In this example the capacitor plates 702 are positioned radially outside the planar vibrating structure 703, between the radial portion of the compliant supports 705 and the outer periphery of the ring resonator structure 703. The capacitor plates 702 form a second set of transducers fixed in the same plane as the planar vibrating structure 703 and set at a distance $d_1$ from the planar vibrating structure 703. When the ring resonator structure 703 oscillates in-plane, any imbalanced motion can be fine-tuned by applying voltages to one or more of the capacitor plates 702 to create electrostatic forces across the gap $d_1$.

Figure 9:
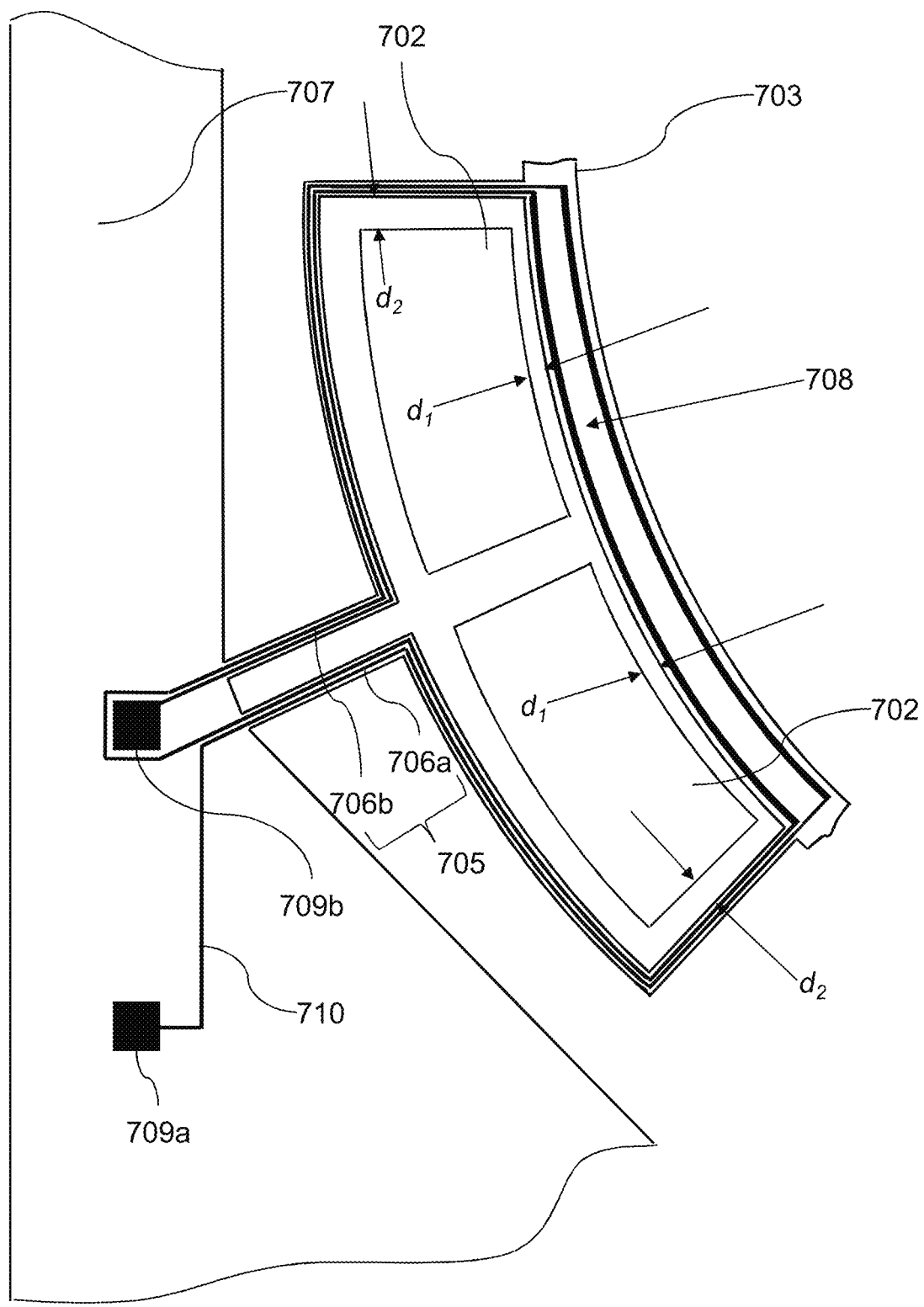
FIG. 9 shows an exemplary layout of a transducer in an inductive-type vibrating structure angular rate sensor including electrostatic balancing plates according to the present disclosure.

FIG. 9 shows an exemplary layout of an inductive transducer 708 suitable for use with the additional electrostatic balancing plates of the present disclosure. The inductive transducer 708 is arranged on a segment of the ring resonator structure 703, the ring resonator structure 703 being supported by eight compliant supports 705 as shown in FIG. 8. The compliant supports 705 are connected to a mount 707 formed in the same silicon layer as the ring resonator structure 703, each compliant support 705 comprising a symmetrical pair of compliant legs 706a, 706b. Each inductive transducer 708 comprises a conductive tracking loop 710. Each conductive tracking loop 710 passes from a first contact pad 709a, located on the mount 707, along the first leg 706a of the compliant support 705, around an eighth segment on the surface of the ring resonator structure 703 and then back to a second contact pad 709b on the mount 707 via the adjacent leg 706b of the pair. Electrostatic balancing plates 702 are positioned radially outside the ring resonator structure 703, between the radial portion of the compliant supports 705 and the outer periphery of the ring resonator structure 703. The electrostatic balancing plates 702 are fixed at a first distance $d_1$ from the ring resonator structure 703, and at a second distance $d_2$ from the adjacent compliant support leg 706a, 706b.

Figure 10:
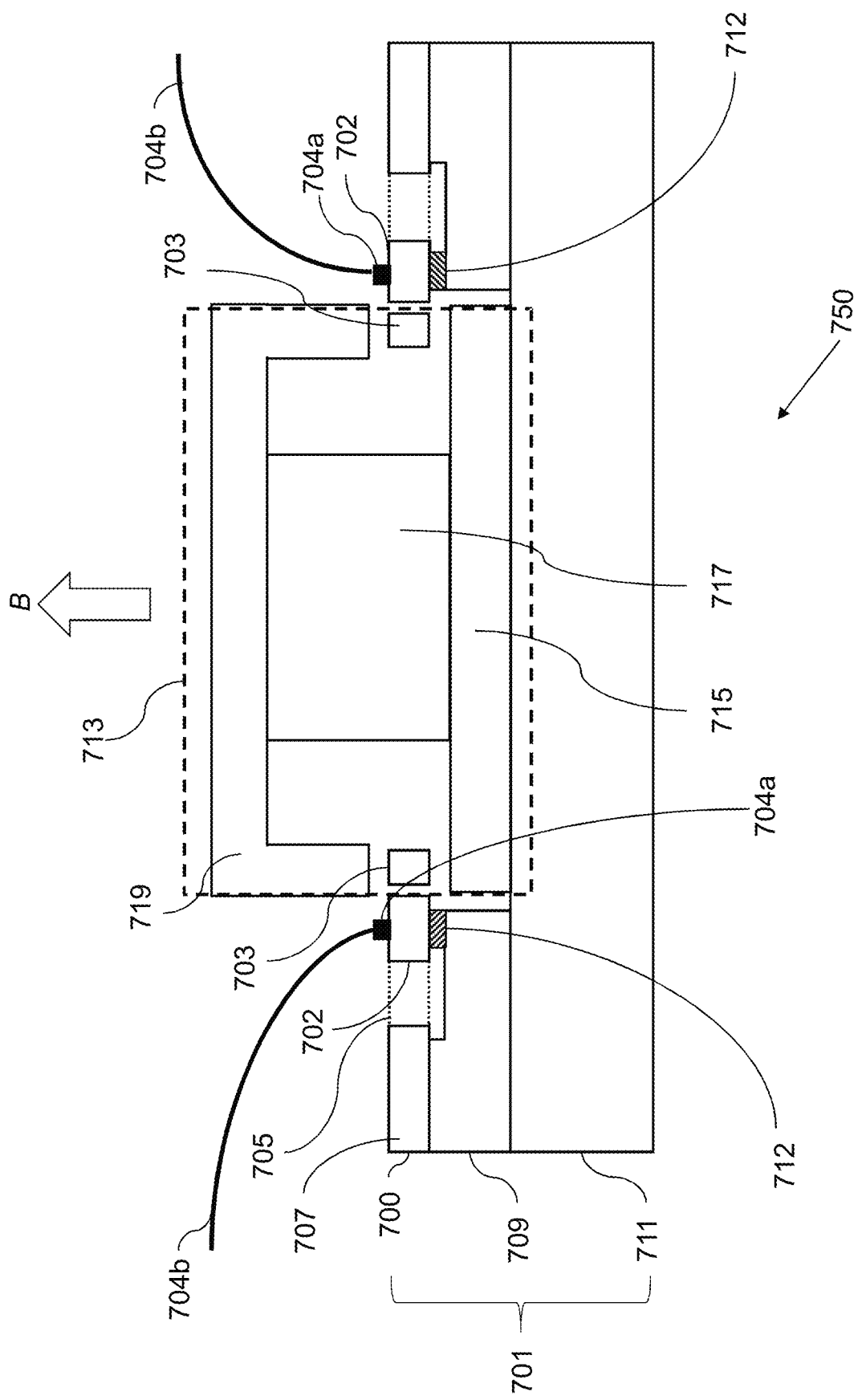
FIG. 10 shows a cross-sectional view of an inductive-type vibrating structure angular rate sensor comprising a vibrating planar ring structure including electrostatic balancing plates according to the present disclosure.

As seen in FIG. 10, the capacitor plates 702 are rigidly bonded to a glass pedestal layer 709 which is modified to include additional support sections 712 which extend below the capacitor plates 702. The compliant supports 705 shown in FIG. 8 each include a symmetrical pair of compliant legs 706a, 706b. The compliant legs 706a, 706b are attached at one end to the periphery of the ring resonator structure 703, and at the other end to the mount 707. In this example the capacitor plates 702 are arranged in eight pairs 702a-702h, each pair 702a-702h fixed between the compliant legs 706a, 706b of a respective one of the supports 705. To achieve electrostatic balancing of the ring resonator structure 703 in an inductive gyroscope of the type described above, conductive pads are applied to the surface of the capacitor plates 702 to allow for DC voltages to be selectively applied, as will be described further below. The ring resonator structure 703 is electrically excited, and its motion sensed, by applying conductive tracking on the surface of the MEMS structure 701, in a manner equivalent to that described in relation to FIG. 3, and as shown in FIG. 10. The result is eight inductive transducers 708 arranged on the ring resonator structure 703, as shown schematically in FIG. 8.

FIG. 10 shows a cross-sectional view of an inductive gyroscope 750 comprising the fully assembled MEMS structure 701 according to the present disclosure, including the capacitor plates 702. A conductive pad 704a is formed on the surface of each capacitor plate 702 with an electrical lead (such as a wire bond) 704b acting as a direct electrical connection to enable a voltage to be applied to the conductive transducer 702. Similarly to the prior art inductive gyroscope 250 shown in FIG. 3, the mount 707 of the silicon layer 700 of the MEMS structure 701 is bonded to a glass pedestal layer 709 which is in turn bonded to a glass support 711. However, in FIG. 10 the glass pedestal layer 709 is modified to include additional support sections 712 which extend below the capacitor plates 702. A magnetic circuit 713, which consists of an annular disc lower pole piece 715, a disc shaped permanent magnet 717, and an annular upper pole piece 719, is also bonded to the glass support 711, in an identical manner to the magnetic circuit of the prior art gyroscope 250. The magnetic circuit 713 is arranged such that a magnetic field, B, is provided which is focused around the ring resonator structure 703, perpendicular to the plane of the ring.

Figure 11:
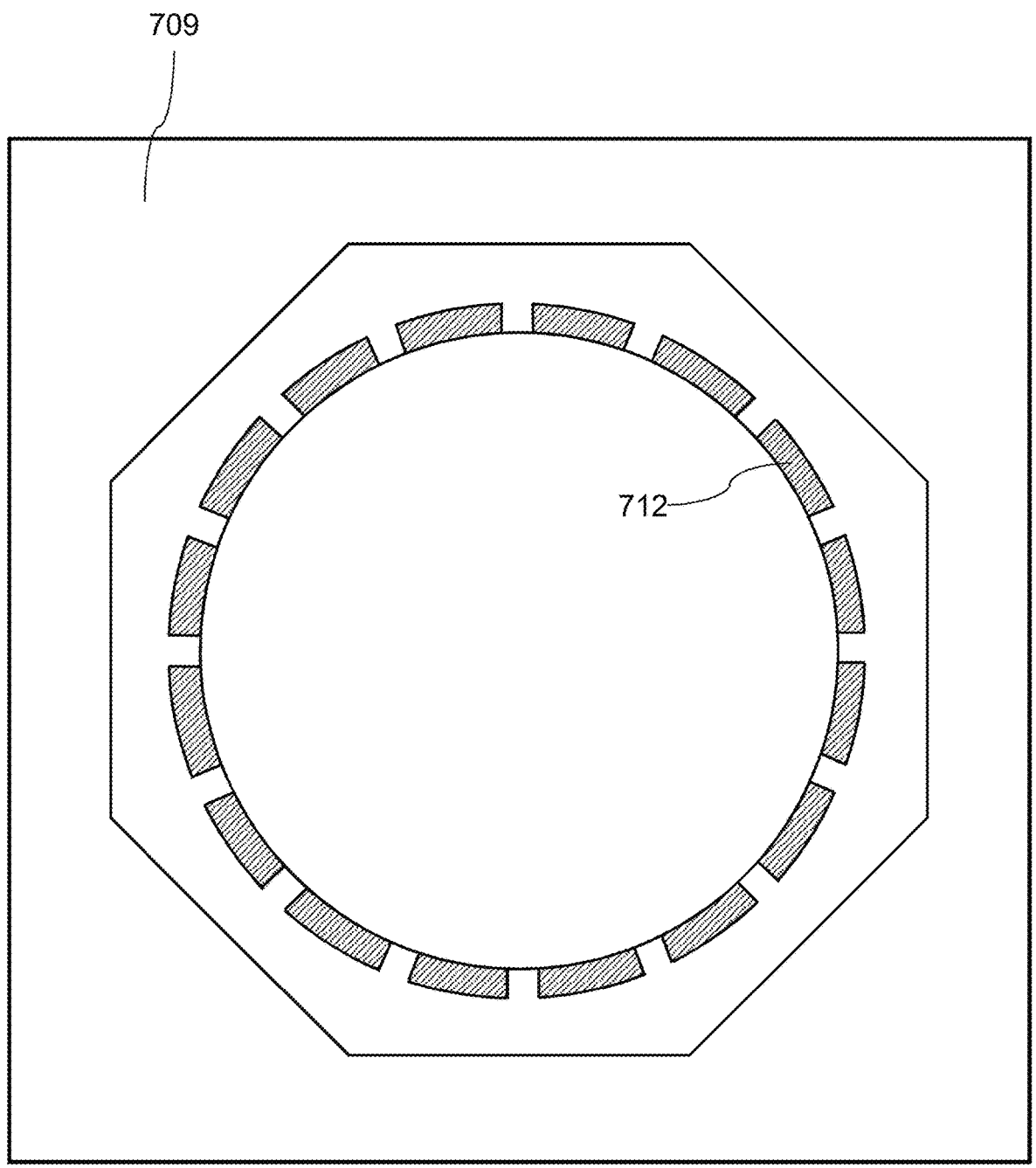
FIG. 11 shows a plan view of the layout a supporting glass layer configured to support electrostatic balancing plates in a vibrating planar ring structure according to the present disclosure.

A plan view of the glass layer 709 is illustrated in FIG. 11 which shows the raised attachment areas including the 16 additional support sections 712 to which the capacitor plates 702 are affixed in FIG. 10. The areas under the ring resonator structure 703 and the compliant supports 705 remain cavitated, as previously described, to enable the ring resonator structure 703 to move freely.

While the MEMS structure 701 can be used to detect signals indicative of motion of the ring resonator structure 703 in a similar manner to the prior art MEMS structure 201, the addition of the capacitor plates 702 allows electrostatic balancing to be applied to better match the mode frequencies.

The mode frequency, ω, may be adjusted by varying the voltage on the capacitor plates 702 which acts as a negative spring, $K_{Elec}$, and locally reduces the effective stiffness of the ring resonator structure 703, and hence the frequency ω, according to the following equation:

$$\omega = \sqrt{\frac{K + K_{Elec}}{m}}$$

Where m is the modal mass of the ring resonator structure 703 and K is the combined spring constant of the ring resonator structure 703 and the compliant supports 705. The electrical spring constant, $K_{Elec}$, is given by:

$$K_{Elec} = -\frac{\varepsilon_0 A V^2}{d^3}$$

Where $\varepsilon_0$ is the permittivity of free space, A is the area of the capacitor plate 702, V is the differential voltage between the ring resonator structure 703 and the capacitor plate 702, and d is the capacitor gap (i.e. the minimum distance between the capacitor plate 702 and the ring resonator structure 703).

The ring resonator structure 703 and capacitor plate structures 702 can be fabricated from bulk silicon using a DRIE process, capable of producing trenches with a high aspect ratio. The capacitor gap $d_1$ between the capacitor plate 702 and the surface of the ring resonator structure 703 is conveniently in the order of 10 μm to 30 μm in order to provide a large capacitance and hence a wide tuning range.

As can be seen in FIG. 8, there is a constant gap $d_1$ between the capacitor plates 702 and the ring resonator structure 703, and a constant gap $d_2$ between the capacitor plates 702 and the adjacent compliant support leg 706a, 706b, which are shown in FIG. 8 as being equal i.e. $d_1=d_2$. The electrostatic tuning for each individual capacitor plate 702 will therefore adjust the electrical spring stiffness of both the ring resonator structure 703 and the adjacent compliant support 705. The effective axis for the ring stiffness adjustment will be at the mid-point of the capacitor plate 702, however changes in the stiffness of the compliant supports 705 will act at the point of attachment of the compliant supports 705 to the ring resonator structure 703. The resultant stiffness tuning axis will therefore be shifted to some extent from the centre of the capacitor plate 702 towards the compliant supports 705. The electrostatic tuning axis for the capacitor plates 702 will therefore no longer be equi-angularly spaced. Assuming the magnitude of the shift is known, this can be taken into account when determining the required tuning voltages. However the effect on the stiffness of the compliant supports 705 can be significantly reduced by increasing the gap $d_2$ between the capacitor plates 702 and the compliant supports 705 compared to the gap $d_1$ between the capacitor plates 702 and the ring resonator structure 703. An example of this can be seen in FIG. 9, in which the gap $d_2$ between the capacitor plates 702 and the compliant supports 705 can be seen to be larger than the gap $d_1$ between the capacitor plates 702 and the ring resonator structure 703. If the gap $d_2$ is increased by a factor of two compared to the ring gap $d_1$ then the effect will be reduced by a factor of eight due to the gap dependence of the stiffness tuning.

Electrostatic balancing provided by the capacitor plates 702 may be used as well as or in place of the conventional laser balancing process to match the mode frequencies. The required frequency tuning range would therefore be ±10 Hz which drives a requirement for small capacitor gaps and a high maximum differential voltage range in order to achieve the required electrical spring stiffness adjustment range. However, if the standard laser balancing process is used to provide a fine tuning capability, these requirements become less demanding. In the embodiment shown in FIG. 8 the required tuning range will be limited to less than ±0.5 Hz allowing reduced voltages and larger gaps. The use of larger gaps, as shown in FIG. 9, is particularly advantageous as this allows a higher amplitude of motion for the ring structure which results in improved noise performance. The addition of the capacitor plates 702 therefore allows electrostatic balancing capability to be applied to existing inductively actuated planar MEMS ring resonator devices. This has clear benefits in terms of the bias performance characteristics.

In practice however, there are significant challenges in terms of the fabrication and packaging of the MEMS structure 701. Ideally, the fabrication process should be substantially compatible with existing manufacturing processes and equipment.

Typical prior art processes (such as that described in relation to FIG. 7) for the fabrication of a MEMS sensor, e.g. MEMS sensor 201, include a DRIE step 604, in which the silicon sections between the legs 206a, 206b of the compliant supports 205, and the section inside the ring resonator structure 203, are unsupported and are detached from the wafer when the support wafer is removed. As such, without modification, the addition of capacitor plates as part of a typical fabrication process is not possible without modifying the design of prior art MEMS structures, as the capacitor plates would be similarly unsupported and would detach from the wafer when the support handle is removed. Design modifications and additional process steps are therefore required to enable capacitor plates to be formed in the required locations around the periphery of the ring resonator structure of existing MEMS structures such as MEMS structure 201.

To achieve this, the DRIE trench etch pattern may be modified to provide pairs of capacitor plates 702 which are attached to the silicon layer 700 at each of the compliant support 705. Specifically, the trench pattern is etched to provide a pair of capacitor plates 702 at each compliant support 705, between the compliant legs 706a, 706b.

Figure 12A:
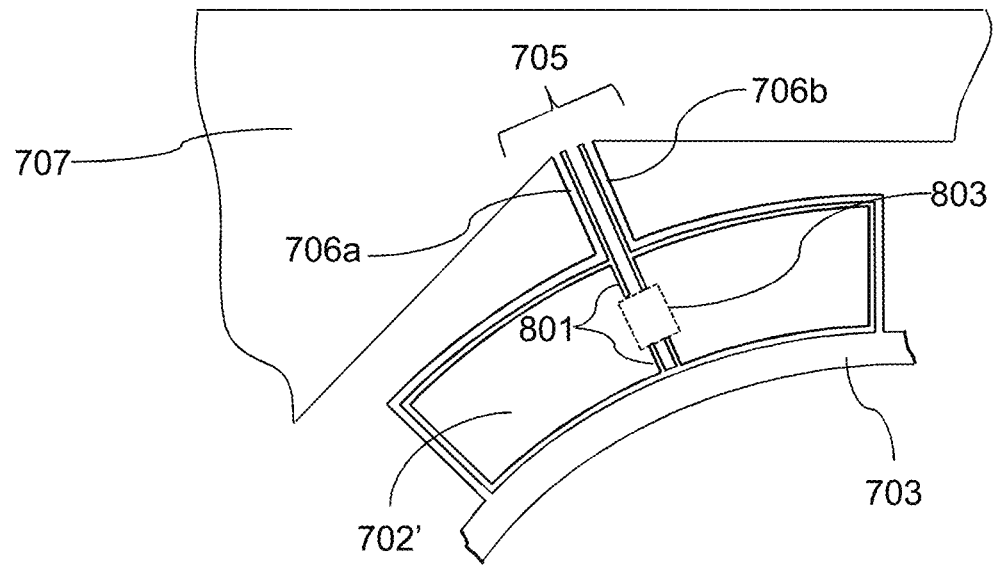
FIGS. 12a and 12b illustrate a processing method for electrically isolating electrostatic balancing plates in a vibrating planar ring structure according to the present disclosure.

FIG. 12a shows an exemplary embodiment in which a silicon arc belonging to the ring 703 is formed comprising a semi-isolated region 702' supported by a rigid support beam structure 801. The semi-isolated region 702' is partially separated by etch trenches leaving a short un-etched silicon section 803 between the adjacent side faces of the two halves of the semi-isolated region 702'. The semi-isolated region 702' becomes rigidly attached to the supporting glass areas 712 shown in FIG. 11 during the anodic bonding process which bonds the silicon layer 700 and the glass layer 709 together.

Figure 12B:
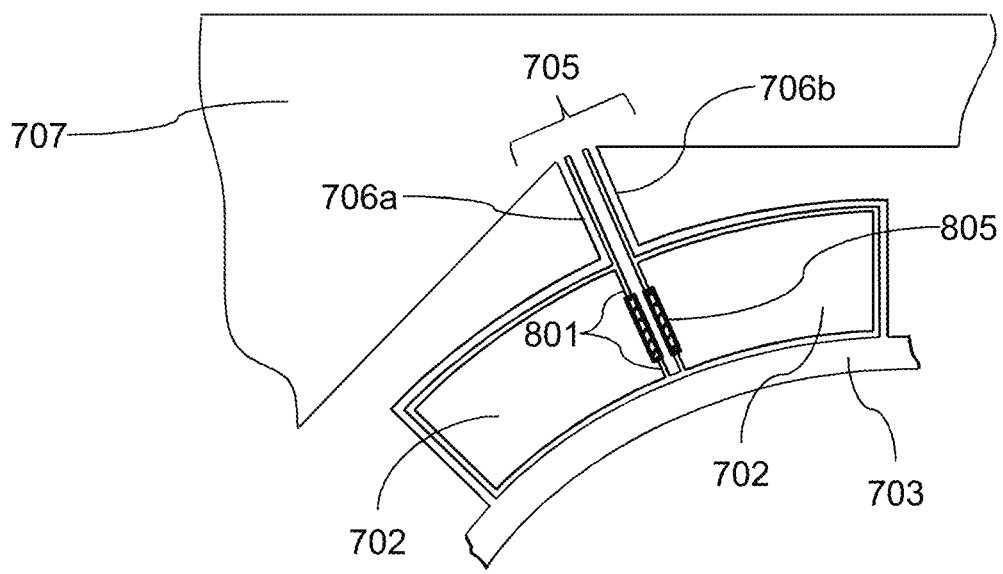

The un-etched silicon section 803 between the pairs of semi-isolated regions 702' of the arc can be conveniently removed using a laser cutting process to remove the silicon between the support beam structures 801 to produce a laser-cut region 805 as shown in FIG. 12b. Each semi-isolated region 702' is then split into a pair of electrically isolated capacitive regions 702 i.e. capacitor plates 702. Femto-second lasers are known to produce high quality side wall profiles with a minimal heat affected zone so are suitable for this purpose. However, the requirement is simply to electrically isolate the resultant capacitor plates 702 and therefore as the precise metrology of the cut lines are not in a critical area in terms of the operation of the gyroscope and alternative, lower cost laser cutting solutions may also be used. The laser cutting process can be applied as an additional step without disrupting the subsequent manufacturing process flow.

Once the sixteen electrostatic balancing capacitor plates 702 are formed, they are electrically connected to a DC voltage (or to ground potential). A differential voltage may therefore be applied between the capacitor plates 702 and the ring resonator structure 703, which is fixed at ground potential, in order to implement electrostatic balancing. In order to balance the cos 2θ modes, the capacitor plates 702 are used in sets of four at an angular spacing of 90° with respect to one another. Four separate DC voltages need to be applied to the MEMS device and each voltage must be applied to all four plates within each set resulting in a requirement for sixteen separate connections onto the MEMS. The DC voltages can be applied by means of additional pins in a package similar to that shown in FIGS. 4 and 5, with wire bonds 704b formed between the pins and metal bond pads 704a on the surface of the capacitor plates 702 (as shown in FIG. 10). While this approach increases the number of required pin connections, and may potentially increase the overall package size, the addition of the capacitor plates 702 allows electrostatic balancing capability to be applied to existing inductively actuated planar MEMS ring resonator devices, reducing the effects of quadrature bias error.

In addition to its application to gyroscopes with inductive transducers, such as inductive gyroscope 750 shown in FIG. 10, this invention may also be applied to other MEMS gyroscope types employing alternative transducer mechanisms and which require the relative frequencies of the two operating modes to be adjusted or matched in frequency. For example, electrostatic balancing capacitor plates could be applied to a MEMS gyroscope employing piezoelectric (PZT) transducers, for example of the kind described in U.S. Pat. No. 8,381,590 in which PZT transducers are formed on the top surface of a ring resonator structure.

Figure 14:
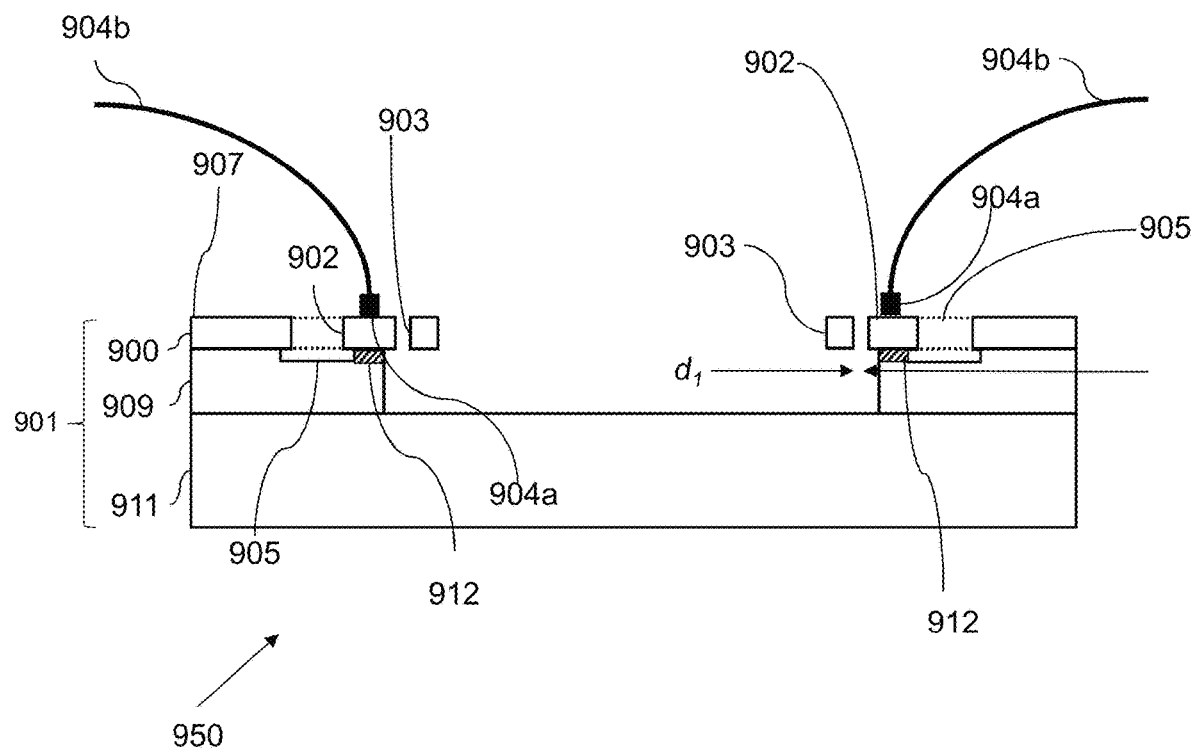
FIG. 14 shows a cross-sectional view of a piezoelectric-type vibrating structure angular rate sensor comprising a vibrating planar ring structure including electrostatic balancing plates according to the present disclosure.

In PZT gyroscopes, construction of the PZT transducers on the surface of the resonator includes the formation of an insulating oxide layer on the upper surface of the silicon over which a metal electrode layer is deposited. A thin film PZT layer is then formed on top of the metallic layer and a second metallic top electrode layer is formed over the PZT layer. The PZT layered structure is then patterned such that the transducers are provided only in specific areas on the ring and leg structures. FIG. 14 of U.S. Pat. No. 8,381,590 shows an exemplary PZT MEMS gyro structure and transducer layout for a ring structure which is internally mounted, via a multiplicity of compliant supports, to a rigid central hub. It will be understood that alternative configurations are also possible including those where the ring is mounted via external legs which connect to a rigid external frame.

Figure 13:
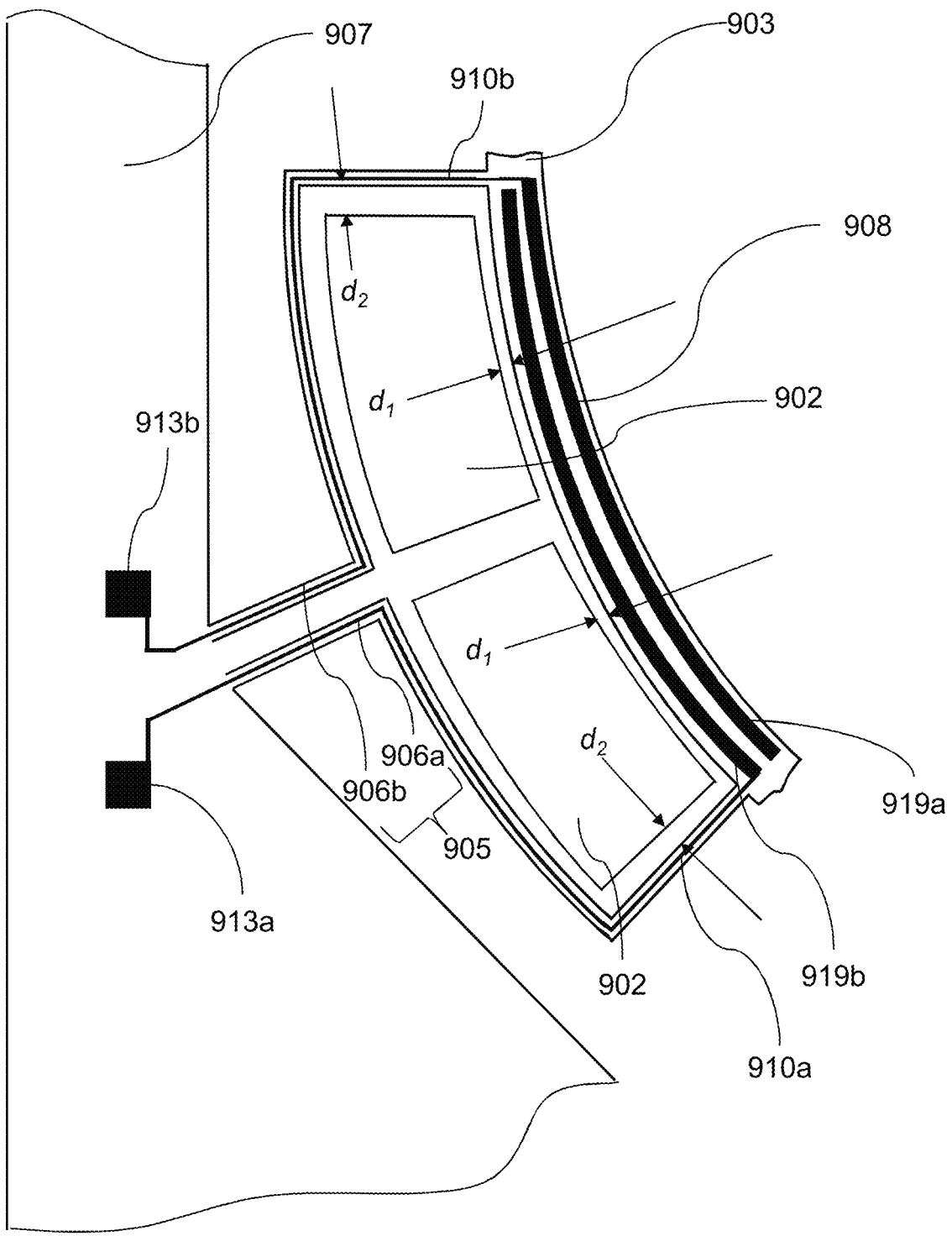
FIG. 13 illustrates a layout of a transducer in a piezoelectric-type vibrating structure angular rate sensor.

FIG. 13 shows an exemplary layout of a PZT transducer 908 suitable for use with the additional electrostatic balancing plates of the present disclosure. The PZT transducer 908 is arranged on a segment of a ring resonator structure 903, the ring resonator structure 903 being supported by eight compliant supports 905 in the same way as seen in FIG. 8. The compliant supports 905 are connected to a mount 907 in the same silicon layer as the ring resonator structure 903, each compliant support 905 comprising a pair of compliant legs 906a, 906b as previously described. The PZT transducer 908 comprises a pair of piezoelectric electrodes 919a, 919b mounted on the surface of the resonator structure 903, which are connected by respective metal tracking 910a, 910b to contact pads 913a, 913b on the mount 907. The overall layout of the PZT transducers 908 around the ring resonator structure 903 is similar to that shown in FIGS. 8 and 9 for the inductive transducers 708 in an inductive gyroscope. Electrostatic balancing plates 902 similar to capacitor plates 702 are added to the MEMS structure, enabling the mode frequencies to be adjusted as described earlier in relation to the inductive gyroscope 750. The electrostatic balancing plates 902 are fixed at a first distance $d_1$ from the ring resonator structure 903, and at a second distance $d_2$ from the adjacent compliant support leg 906a, 906b.

FIG. 14 shows a cross-sectional view of a piezoelectric gyroscope 950 comprising a MEMS structure 901 including the ring resonator 903 and capacitor plates 902 for electrostatic balancing. In this cross-sectional view it can be seen that a conductive pad 904a is formed on the surface of each capacitor plate 902 with an electrical lead (such as a wire bond) 904b acting as a direct electrical connection to enable a voltage to be applied to the conductive transducer 904a.

Similarly to the MEMS structures 201 and 701 shown in FIGS. 4 and 10 respectively, the mount 907 of the silicon layer 900 of the MEMS structure 901 is bonded to a glass pedestal layer 909 which is in turn bonded to a glass support 911. The glass pedestal layer 909 is modified to include additional support sections 912 which fix the capacitor plates 902 at a distance $d_1$ from the ring resonator 903. In this way, the capacitor plates 902 may be added to existing piezoelectric MEMS gyroscopes to allow electrostatic balancing capability and reduce quadrature bias error.

Thus it will be seen that, in accordance with the present disclosure, electrostatic balancing capability may be applied to existing MEMS gyroscopes, resulting in improved bias performance characteristics in devices which are inherently immune to charge trapping effects.

The invention claimed is:

1. A vibrating structure angular rate sensor, comprising:
 a mount;
 a planar vibrating structure;
 a plurality of compliant supports extending between the mount and the planar vibrating structure to support the vibrating structure, thereby allowing the planar vibrating structure to oscillate in its plane relative to the mount in response to an electrical excitation;
 a first set of transducers arranged on the planar vibrating structure to apply, in use, an electrical excitation to the planar vibrating structure and to sense, in use, motion resulting from oscillation of the planar vibrating structure in its plane, wherein the first set of transducers comprises a first set of piezoelectric electrodes formed on the surface of the planar vibrating structure; and
 a plurality of capacitive regions fixed at a distance from the planar vibrating structure in its plane, wherein the capacitive regions form a second set of transducers configured to apply, in use, an electrostatic force to the planar vibrating structure which induces a change in the frequency of oscillation of the planar vibrating structure.

2. The vibrating structure angular rate sensor of claim 1, wherein
 a first subset of the first set of transducers is configured to cause the planar vibrating structure to oscillate relative to the mount in a primary mode;
 a second subset of the first set of transducers is configured to sense motion resulting from oscillation of the planar vibrating structure relative to the mount in a secondary mode induced by Coriolis force when an angular rate is applied around an axis substantially perpendicular to the plane of the planar vibrating structure;
 a third subset of the first set of transducers is configured to sense motion resulting from oscillation of the planar vibrating structure in the primary mode; and
 the second set of transducers is configured to apply an electrostatic force to the planar vibrating structure which induces a change in the frequency of oscillation in the primary mode and/or secondary mode so as to match the frequencies.

3. The vibrating structure angular rate sensor of claim 2, wherein
 a fourth subset of the first set of transducers is configured to apply an electrical excitation to null the oscillation of the planar vibrating structure in the secondary mode.

4. The vibrating structure angular rate sensor of claim 3, wherein the plurality of capacitive regions is arranged symmetrically around the planar vibrating structure in a circumferential arrangement.

5. The vibrating structure angular rate sensor of claim 1, further comprising:
 a magnetic circuit, configured to produce a magnetic field perpendicular to the plane of the planar vibrating structure, and
 wherein the first set of transducers comprises conductive tracking formed on a surface of the planar vibrating structure.

6. The vibrating structure angular rate sensor of claim 1, further comprising:
- a first set of electrical connections to the first set of transducers; and
- a second set of electrical connections to the second set of transducers, the first and second sets of electrical connections being independent of one another.

7. The vibrating structure angular rate sensor of claim 1, wherein the compliant supports comprise conductive tracking extending between the mount and the first set of transducers;
- the structure further comprising a direct electrical connection to the second set of transducers.

8. The vibrating structure angular rate sensor of claim 1, wherein one or more of the plurality of capacitive regions is fixed at a distance $d_1$ from the planar vibrating structure and at a distance $d_2$ from the compliant supports, wherein $d_2 > d_1$.

9. A method of forming a vibrating structure angular rate sensor, comprising:
- modifying a first substrate to define a planar vibrating structure and a plurality of compliant supports, the compliant supports extending between a mount formed from the first substrate and the planar vibrating structure to support the planar vibrating structure, thereby allowing the planar vibrating structure to oscillate relative to the mount in response to an electrical excitation;
- forming a first set of transducers on the planar vibrating structure for applying an electrical excitation to the vibrating structure and for sensing motion resulting from oscillation of the planar vibrating structure, wherein the first set of transducers comprises a first set of piezoelectric electrodes formed on the surface of the planar vibrating structure; and
- forming a plurality of capacitive regions, fixed at a distance from the planar vibrating structure in its plane, wherein the capacitive regions form a second set of transducers for applying an electrostatic force to the planar vibrating structure to induce a change in the frequency of oscillation of the planar vibrating structure.

10. The method of claim 9, wherein forming the plurality of capacitive regions comprises modifying the first substrate to define the plurality of capacitive regions in the same material layer.

11. The method of claim 9, wherein forming the plurality of capacitive regions comprises:
- modifying the first substrate to define a plurality of regions;
- then fixing the first substrate to a second substrate, the second substrate comprising support sections configured to support the plurality of capacitive regions; and
- then separating each of the regions into a pair of electrically isolated capacitive regions.

12. The method of claim 9 wherein forming the first set of transducers comprises forming conductive tracking on a surface of the planar vibrating structure.

13. The method of claim 9, wherein forming the second set of transducers comprises forming a set of electrodes on the capacitive regions having an electrical connection independent of the first set of transducers.

* * * * *